US012630365B2

(12) United States Patent (10) Patent No.: US 12,630,365 B2
Minoo et al. (45) Date of Patent: May 19, 2026

(54) TRANSFER SYSTEM, METHOD FOR CONTROLLING TRANSFER SYSTEM, AND RECORDING MEDIUM

(71) Applicant: DAIFUKU CO., LTD., Osaka (JP)

(72) Inventors: Atsushi Minoo, Tokyo (JP); Hiroyuki Kusube, Tokyo (JP); Yuichi Ueda, Shiga (JP); Masashi Morikawa, Shiga (JP); Tomokazu Nakamura, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 392 days.

(21) Appl. No.: 18/498,939

(22) Filed: Oct. 31, 2023

(65) Prior Publication Data

US 2024/0150122 A1 May 9, 2024

(30) Foreign Application Priority Data

Nov. 8, 2022 (JP) ................................. 2022-179115

(51) Int. Cl.
　　*B65G 1/137* (2006.01)
　　*B25J 9/16* (2006.01)
　　*B25J 15/06* (2006.01)
(52) U.S. Cl.
　　CPC .......... *B65G 1/1373* (2013.01); *B25J 9/1612* (2013.01); *B25J 9/1697* (2013.01); *B25J 15/0683* (2013.01); *B65G 2203/0233* (2013.01); *B65G 2203/041* (2013.01)
(58) Field of Classification Search
　　CPC .... B65G 1/1373; B25J 9/1697; B25J 15/0683
　　See application file for complete search history.

(56) References Cited

U.S. PATENT DOCUMENTS

| | | | | |
|---|---|---|---|---|
| 2006/0104788 A1* | 5/2006 | Ban | .................. | G06T 1/0014 |
| | | | | 414/729 |
| 2014/0277719 A1 | 9/2014 | Kamiya et al. | | |
| 2018/0178992 A1* | 6/2018 | Gondoh | .............. | B65G 1/0485 |

(Continued)

FOREIGN PATENT DOCUMENTS

| | | |
|---|---|---|
| CN | 114346821 A | 4/2022 |
| JP | 09-141356 | 6/1997 |

(Continued)

OTHER PUBLICATIONS

Japanese Office Action and English translation for Japanese Application No. 2022-179115 mailed Jul. 15, 2025.

*Primary Examiner* — Adnan M Mirza
(74) *Attorney, Agent, or Firm* — Harness, Dickey & Pierce, P.L.C.

(57) ABSTRACT

In order to determine, without a trial, whether or not an article can be transferred and in order to reset the article in a case where the article cannot be transferred, provided is a transfer system including: a first determining section that determines whether or not a transferring section can hold and transfer an article, on the basis of a posture of the article an image of which has been captured by a camera section; and an adjusting section that, in a case where the first determining section determines that the transferring section cannot transfer the article, controls a driving section and a holding direction changing section so that the posture and a position of the article are adjusted to a posture and a position that allow the transferring section to transfer the article.

11 Claims, 17 Drawing Sheets

(56) References Cited

U.S. PATENT DOCUMENTS

| | | | | |
|---|---|---|---|---|
| 2019/0177095 A1* | 6/2019 | Ukisu | .................. | B65G 1/0485 |
| 2021/0023710 A1* | 1/2021 | Aloisio | .................. | B25J 9/1697 |
| 2021/0308866 A1* | 10/2021 | Zhu | .......................... | B25J 19/04 |

FOREIGN PATENT DOCUMENTS

| | | | |
|---|---|---|---|
| JP | 2000-304509 | A | 11/2000 |
| JP | 2001179669 | A | 7/2001 |
| JP | 2001213521 | A | 8/2001 |
| JP | 2005-305613 | A | 11/2005 |
| JP | 2013-158889 | A | 8/2013 |
| JP | 2014-180705 | A | 9/2014 |
| JP | 2018-104126 | A | 7/2018 |
| JP | 2019-042828 | A | 3/2019 |
| JP | 2019104571 | A | 6/2019 |
| JP | 2022-090523 | A | 6/2022 |
| WO | 2019/069361 | A1 | 4/2019 |

* cited by examiner

TRANSFER SYSTEM, METHOD FOR CONTROLLING TRANSFER SYSTEM, AND RECORDING MEDIUM

This Nonprovisional application claims priority under 35 U.S.C. § 119 on Patent Application No. 2022-179115 filed in Japan on Nov. 8, 2022, the entire contents of which are hereby incorporated by reference.

TECHNICAL FIELD

The present invention relates to a transfer system in physical distribution in which transfer system an article is transferred.

BACKGROUND ART

In distribution warehouses etc., a transfer system including a picking device (transfer device) is often used so as to efficiently sort articles. With regard to such a transfer system, Patent Literature 1 discloses an article transport facility which includes a transfer device, wherein a holding position at which an article is held by the transfer device is set for each type of article, and the article is reset in a case where the type of the article is not identified with use of an image capturing device.

Patent Literature 2 discloses a load transfer device which causes a trial to be carried out, the trial being a trial of holding a load at a reference holding position that is set in advance so as to correspond to each load, and which, in a case of failure, causes a trial to be carried out again, the trial being a trial of holding the load at a preliminary holding position.

With regard to a robot that picks up a component from inside a box, Patent Literature 3 discloses a device which controls a robot that, in a case where it is determined that the robot has failed to grasp a component, generates such a motion track that the component is pulled toward the center of a box.

CITATION LIST

Patent Literature

[Patent Literature 1]
Japanese Patent Application Publication Tokukai No. 2019-104571
[Patent Literature 2]
Japanese Patent Application Publication Tokukai No. 2001-213521
[Patent Literature 3]
Japanese Patent Application Publication Tokukai No. 2001-179669

SUMMARY OF INVENTION

Technical Problem

However, conventional techniques as described above have the following problems. For example, in the technique disclosed in Patent Literature 1, in a case where the type of an article cannot be identified, the article is reset. Even in a case where the article can be grasped as it is, the article is reset.

In the techniques disclosed in Patent Literatures 2 and 3, an attempt to take some countermeasure is made in a case where grasp of an article is unsuccessful. Until the grasp of the article is found unsuccessful, no countermeasure is taken.

An aspect of the present invention has been made in view of the above problems, and an object thereof is to realize a transfer system in which it is determined, without a trial, whether or not an article can be transferred and, in a case where the article cannot be transferred, the article is reset so that the article can be transferred.

Solution to Problem

In order to attain the above object, a transfer system in accordance with an aspect of the present invention is a transfer system including: a transferring section that transfers an article from a container to an outside of the container, the transferring section including a picking head that holds the article by adhering to the article by suction, a driving section that drives the picking head in a horizontal direction and a vertical direction, and a holding direction changing section that changes a direction in which the picking head is held; a camera section that captures an image of the article in the container; a first determining section that determines whether or not the transferring section can hold and transfer the article, on the basis of a posture of the article the image of which has been captured by the camera section; and an adjusting section that, in a case where the first determining section determines that the transferring section cannot transfer the article, controls the driving section and the holding direction changing section of the transferring section so that the posture and a position of the article are adjusted to a posture and a position that allow the transferring section to hold and transfer the article.

In order to attain the above object, a method for controlling a transfer system in accordance with an aspect of the present invention is a method for controlling a transfer system which includes: a transferring section that transfers an article from a container to an outside of the container and that includes a picking head that holds the article by adhering to the article by suction, a driving section that drives the picking head in a horizontal direction and a vertical direction, and a holding direction changing section that changes a direction in which the picking head is held; and a camera section that captures an image of the article in the container, the method including: a determining step of determining whether or not the transferring section can hold and transfer the article, on the basis of a posture of the article the image of which has been captured by the camera section; and an adjusting step of, in a case where it is determined in the determining step that the transferring section cannot transfer the article, controlling the driving section and the holding direction changing section of the transferring section so that the posture and a position of the article are adjusted to a posture and a position that allow the transferring section to hold and transfer the article.

Advantageous Effects of Invention

According to an aspect of the present invention, it is possible to determine, without a trial, whether or not an article can be transferred and, in a case where the article cannot be transferred, reset the article so that the article can be transferred.

BRIEF DESCRIPTION OF DRAWINGS

FIG. 3 is a functional block diagram illustrating the outline of the transfer system.

FIG. 7 is a drawing for describing a method of resetting an article.

FIG. 15 is a drawing for describing a case where a holdable surface of an article is estimated, and is a drawing illustrating a direction of the holdable surface.

DESCRIPTION OF EMBODIMENTS

Embodiment 1

The following description will discuss Embodiment 1 of the present invention with reference to FIGS. 1 to 13. Note that, in the following description, described as an example is a case where a transfer system in which an article 2 is transferred from a first container 17 to a second container 18 is configured. The first container 17 and the second container 18 can each constitute a shipment container that is shipped to the outside of a transfer system 1.

Outline of Transfer System

Figure 1:
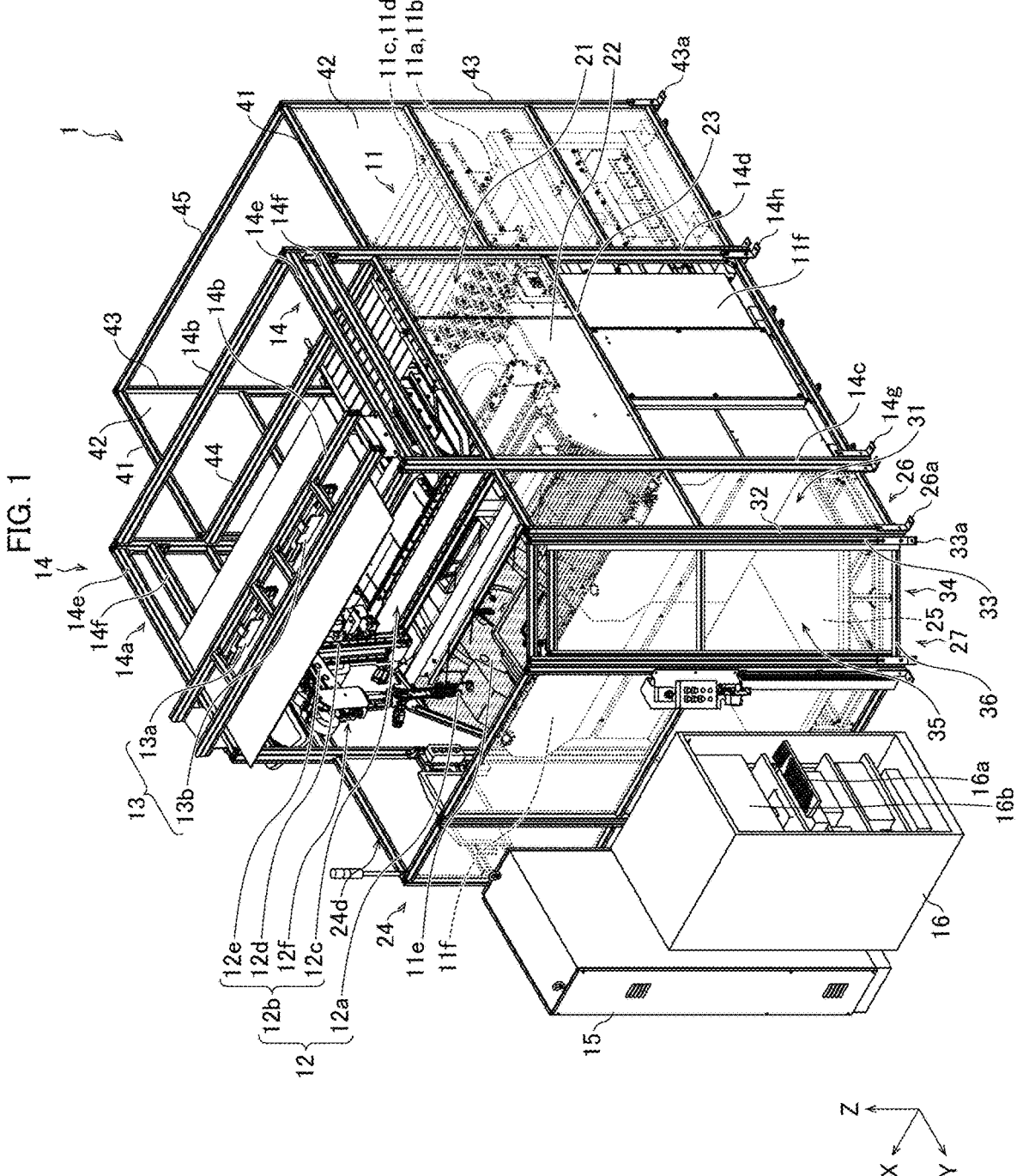
FIG. 1 is a perspective view illustrating an outline of a transfer system in accordance with an embodiment of the present invention.
Figure 2:
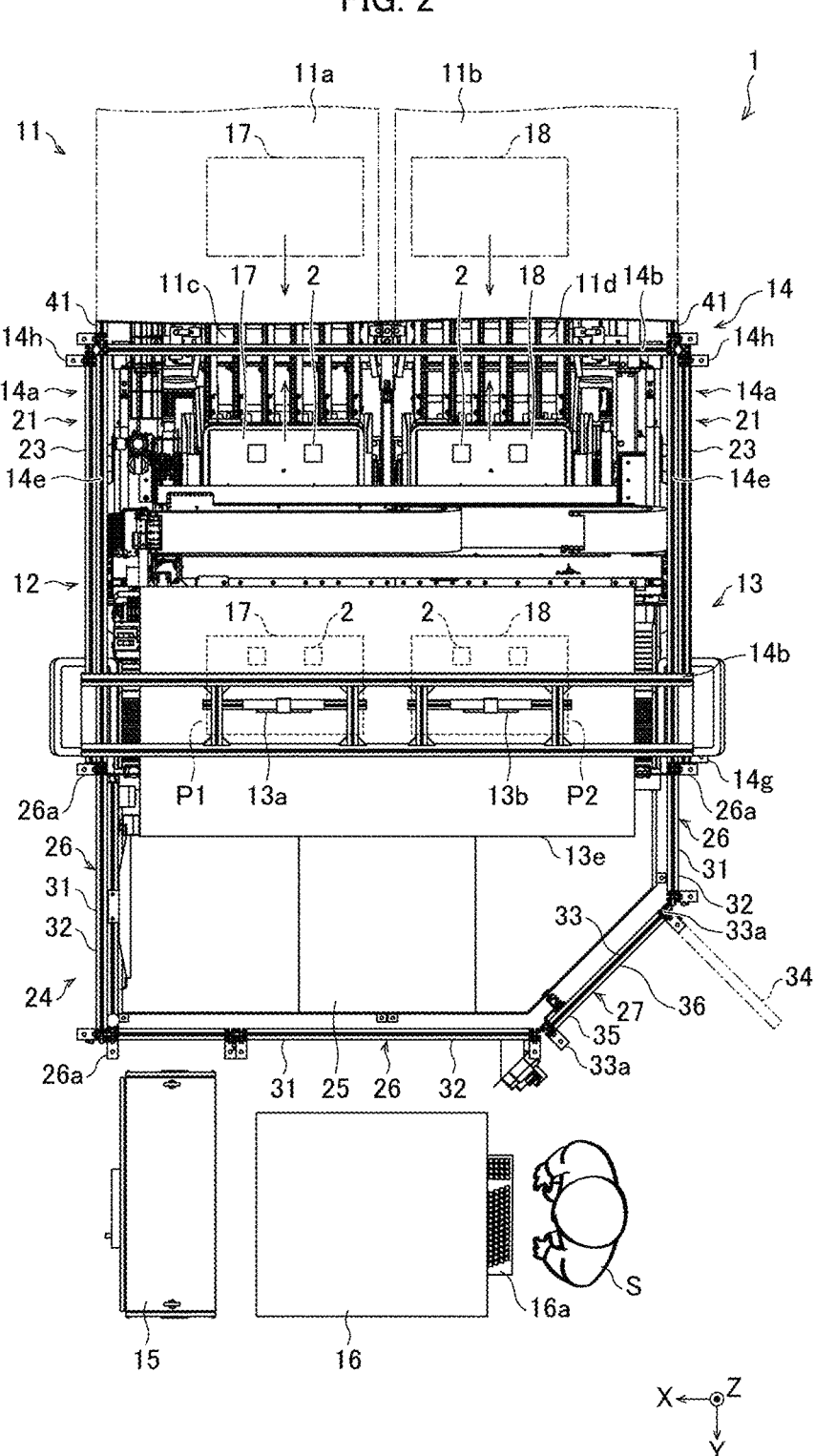
FIG. 2 is a plan view illustrating the outline of the transfer system.

First, an outline of the transfer system 1 is described with reference to FIGS. 1 and 2. FIG. 1 is a perspective view illustrating the outline of the transfer system 1 in accordance with the present embodiment. FIG. 2 is a plan view illustrating the outline of the transfer system 1. The transfer system 1 is for transferring the article 2 in a distribution warehouse or the like. As illustrated in FIGS. 1 and 2, the transfer system 1 in accordance with the present embodiment includes a transporting section 11, a transferring section 12, a camera section 13, a support frame 14, a control section 15, and a terminal section 16.

Transporting Section

The transporting section 11 transports, in a Y direction (front-rear direction, first direction), the first container 17 and the second container 18 in each of which the article 2 is housed. Specifically, the transporting section 11 includes carry-in conveyors 11a and 11b that are provided to a lower side in a Z direction and carry-out conveyors 11c and 11d that are provided to an upper side in the Z direction. By the carry-in conveyors 11a and 11b, the first container 17 and the second container 18 are respectively transported to a front side in the Y direction. By the carry-out conveyors 11c and 11d, the first container 17 and the second container 18 are respectively transported to a rear side in the Y direction.

The transporting section 11 further includes a moving mechanism 11e and a housing 11f. The moving mechanism 11e moves, in order, first containers 17 from the carry-in conveyor 11a to a first transfer position P1, and moves, in order, second containers 18 from the carry-in conveyor 11b to a second transfer position P2. The moving mechanism 11e also moves, to the carry-out conveyor 11c in order, the first containers 17 each placed at the first transfer position P1, and moves, to the carry-out conveyor 11d in order, the second containers 18 each placed at the second transfer position P2. The housing 11f houses the moving mechanism 11e therein.

Transferring Section

The transferring section 12 is disposed to a front end side (one end side) of the transporting section 11 in the Y direction. The transferring section 12 holds the article 2 that is housed in the first container 17 placed at the first transfer position P1, and transfers the article 2 to the second container 18 placed at the second transfer position P2. The transferring section 12 is disposed to an upper side of the moving mechanism 11e and the housing 11f of the transporting section 11 in the Z direction, with use of a base or the like (not illustrated).

The transferring section 12 includes a picking head 12a that holds the article 2 and a driving section 12b that raises and lowers the picking head 12a in the Z direction and that moves the picking head 12a in two directions, i.e., an X direction and the Y direction in a plan view. The picking head 12a is constituted by, for example, one or more suction pads each of which adheres to the article 2 by suction. The picking head 12a adheres, from above by suction, to the article 2 housed in the first container 17, and holds the article 2 in a state of hanging the article 2.

The driving section 12b includes a fixed rail 12c, a first movable rail 12d, a second movable rail 12e, and a support arm 12f. The fixed rail 12c is disposed along the X direction. The first movable rail 12d is disposed along the Z direction, and reciprocates in the X direction along the fixed rail 12c. The second movable rail 12e is disposed along the Y direction, and reciprocates in the Z direction along the first movable rail 12d.

The support arm 12f is disposed along the Z direction, and reciprocates in the Y direction along the second movable rail 12e. The picking head 12a is attached to a lower side of the support arm 12f in the Z direction. With this configuration, in the transferring section 12, it is possible to reciprocate the picking head 12a in three directions, i.e., the X, Y, and Z directions by controlling a motion of the driving section 12b.

The transferring section 12 has a structure that is simpler than that of a transferring unit such as, for example, a six-axis robot, and is easy to apply to a multi-line conveyor layout. Therefore, by using the transferring section 12, a degree of freedom of layout design of the transfer system 1 is improved.

Camera Section

The camera section 13 is disposed above the transferring section 12, and generates a captured image by capturing an image of the article 2. The camera section 13 includes a first camera 13*a* and a second camera 13*b*. The first camera 13*a* captures an image of one or more articles 2 housed in the first container 17 by capturing an image of the first container 17 placed at the first transfer position P1. The second camera 13*b* captures an image of one or more articles 2 housed in the second container 18 by capturing an image of the second container 18 placed at the second transfer position P2. Note that the camera section 13 may include a light or the like, and the first camera 13*a* and the second camera 13*b* may each capture an image of one or more articles 2 in a state where the one or more articles 2 are irradiated by the light or like with a given intensity of illumination.

Support Frame

The support frame 14 is a frame that supports the camera section 13. The support frame 14 includes (i) support parts 14*a* and 14*a* that are each disposed so as to be adjacent to the transferring section 12 in the X direction (lateral direction, second direction) perpendicular to the Y direction in a plan view and (ii) beam members 14*b* and 14*b* that are bridged between the support parts 14*a* and 14*a*. The first camera 13*a* and the second camera 13*b* are disposed at respective appropriate positions on the beam member 14*b* that is located on the front side in the Y direction. Note that the support frame 14 may include a single beam member 14*b* or three or more beam members 14*b*.

The support parts 14*a* and 14*a* each includes two column members 14*c* and 14*d*, a girder member 14*e*, and a reinforcement member 14*f*. The column members 14*c* and 14*d* are arranged in the Y direction, and fixed, by fixing members 14*g* and 14*h*, respectively, to a place in which the transfer system 1 is disposed. The girder member 14*e* and the reinforcement member 14*f* are bridged between the column members 14*c* and 14*d*.

Note that the beam members 14*b* and 14*b* may be disposed on the girder member 14*e* or may be disposed to the column members 14*c* and 14*d*, respectively. The support parts 14*a* and 14*a* may each include two or more reinforcement members 14*f*, or the reinforcement member 14*f* may be omitted. In a case where the support parts 14*a* and 14*a* are each disposed upright by four or more column members, the beam members 14*b* and 14*b* may be omitted. In this case, the first camera 13*a* and the second camera 13*b* may be disposed at respective appropriate positions on the support parts 14*a* and 14*a*.

Control Section and Terminal Section

The control section 15 controls each section of the transfer system 1, and is constituted by, for example, a computer that includes a central processing unit (CPU) and a memory. Control of motions of various configurations is carried out by causing the computer to execute a control program. Details of the control section 15 are described later.

The terminal section 16 is for a worker S (FIG. 2) to conduct an operation with respect to the transfer system 1. The terminal section 16 includes an input section 16*a* such as a keyboard, a touch panel, or a joystick and a display section 16*b* that displays given information. The control section 15 and the terminal section 16 are each an example of a control apparatus of the transfer system 1, and are each disposed to an outer side of a front guard part 24 (described later) and to a side that is, with respect to a work area 25, opposite from a side on which the transferring section 12 is provided (the front side in the Y direction).

Specifically, the control section 15 is connected each of the transporting section 11, the transferring section 12, the camera section 13, and the terminal section 16 via an electric wiring (not illustrated). The control section 15 obtains given information such as a state of a motion from each of the transporting section 11 and the transferring section 12, and outputs a given command signal such as an instruction signal to each of the transporting section 11 and the transferring section 12. The control section 15 outputs a given instruction signal such as an on/off signal to each of the first camera 13*a* and the second camera 13*b* of the camera section 13, and obtains image data from each of the first camera 13*a* and the second camera 13*b*. The control section 15 receives, from the terminal section 16, an instruction signal and the like that correspond to the operation conducted by the worker S, and transmits, to the terminal section 16, information that has been obtained from each of the transporting section 11, the transferring section 12, and the camera section 13.

Guard

In the transfer system 1 in accordance with the present embodiment, the transferring section 12 makes such a motion that the picking head 12*a* reciprocates in three directions, i.e., the X, Y, and Z directions. Therefore, as illustrated in FIGS. 1 and 2, a guard for significantly reducing a possibility that the worker S etc. come into contact with the transferring section 12 is provided around the transferring section 12, from the viewpoint of safety. Specifically, in the present embodiment, as the guard, side guard parts 21, a front guard part 24, and rear guard parts 41 are provided in order from a control apparatus side toward the rear side in the Y direction.

Side Guard Part

As illustrated in FIGS. 1 and 2, the support parts 14*a* and 14*a* respectively include the side guard parts 21 each of which separates the transferring section 12 and the outside of the transferring section 12 in the X direction. Each of the side guard parts 21 includes a transparent plate 22 and a frame member 23 that holds the transparent plate 22. This makes it possible to prevent a human, including the worker S, from entering from the X direction and coming into contact with the transferring section 12. As a result, it is possible to improve the safety of the transfer system 1.

Furthermore, since the side guard parts 21 are respectively provided to the support parts 14*a* and 14*a*, it is not necessary to newly provide, to an outer side of each of the support parts 14*a* and 14*a* in the X direction, a guard part that separates the transferring section 12 and the outside of the transferring section 12 in the X direction. As a result, it is possible to save a space of the transfer system 1.

By the way, the two support parts 14*a* and 14*a* are disposed so as to be adjacent to the transferring section 12 in the X direction. Therefore, the two support parts 14*a* and 14*a* are also adjacent to the housing 11*f* of the transporting section 11 which housing 11*f* is located to a lower side of the transferring section 12 in the Z direction. Thus, in the present embodiment, no side guard part 21 is provided in a region of a lower part of the support part 14*a*, i.e., a region of the support part 14*a* which region faces the housing 11*f*. This makes it possible to reduce a region in which the side guard part 21 is provided. On the other hand, it is possible for the housing 11*f* to prevent the worker S from entering from the lower part of the support part 14*a* and coming into contact with the transferring section 12. That is, in the region of the lower part of the support part 14*a*, the housing 11*f* is a partition that separates the transferring section 12 and the outside of the transferring section 12 in the X direction.

Front Guard Part

In the transfer system 1, as illustrated in FIGS. 1 and 2, the front guard part 24 is provided so as to separate (i) the work area 25 that is set on a side opposite from the transporting section 11 with respect to the transferring section 12 in a plan view and (ii) the outside of the work area 25. The front guard part 24 is connected to the two support parts 14*a* and 14*a*.

The work area 25 is a space for carrying out a manual transfer in which the worker S holds and transfers the article 2. That is, in the transfer system 1 in accordance with the present embodiment, it is possible to carry out both (i) an automatic transfer in which the transferring section 12 holds and automatically transfers the article 2 and (ii) the manual transfer in which the worker S enters the work area 25 and holds and transfers the article 2. The front guard part 24 is provided around the work area 25 so as to be adjacent to the work area 25.

Specifically, the front guard part 24 includes a plurality of fixed guard parts 26 and a movable guard part 27 that are connected to each other. Each of the fixed guard parts 26 includes a transparent plate 31 and a frame member 32 that holds the transparent plate 31. A corner part of the frame member 32 which corner part is located on the lower side in the Z direction is fixed, by a fixing member 26*a*, to the place in which the transfer system 1 is disposed. The fixed guard parts 26 and 26 that are located on the rear side in the Y direction are respectively connected to front sides of the support parts 14*a* and 14*a* in the Y direction.

The movable guard part 27 constitutes an entrance door for the worker S to enter the work area 25. The movable guard part 27 includes a fixed frame member 33 and a movable member 34 that is provided in the fixed frame member 33. A corner part of the fixed frame member 33 which corner part is located on the lower side in the Z direction is fixed, by a fixing member 33*a*, to the place in which the transfer system 1 is disposed. The movable member 34 is rotatably provided to the fixed frame member 33 via a hinge member (not illustrated) or the like. The movable member 34 includes a transparent plate 35 and a frame member 36 that holds the transparent plate 35.

With the above configuration, it is possible to prevent a human, including the worker S, from accidentally entering the work area 25 and coming into contact with the transferring section 12. As a result, it is possible to improve the safety of the transfer system 1. Furthermore, since the front guard part 24 is provided so as to be adjacent to the work area 25, it is possible to suppress an increase, due to provision of the front guard part 24, in a space in which the transfer system 1 is disposed.

Note that, in a case where only the automatic transfer can be carried out in the transfer system 1, the work area 25 may be set as a monitoring area for a monitor to monitor the transferring section 12. Alternatively, the work area 25 may be omitted. In this case, the front guard part 24 may be provided to a front side of the transferring section 12 in the Y direction so as to be adjacent to the transferring part 12.

Rear Guard Part

As illustrated in FIGS. 1 and 2, in the transfer system 1, the rear guard parts 41 and 41 are provided which are, in the X direction, adjacent to a front end of the transporting section 11 in the Y direction and which separate the front end and the outside of the front end in the X direction. Each of the rear guard parts 41 includes a transparent plate 42 and a frame member 43 that holds the transparent plate 42. Front sides of the rear guard parts 41 and 41 in the Y direction are respectively coupled (connected) to rear sides of the support parts 14*a* and 14*a* in the Y direction. A corner part of the frame member 43 which corner part is located on the lower side in the Z direction is fixed, by a fixing member 43*a*, to the place in which the transfer system 1 is disposed. Further, between the rear guard parts 41 and 41, reinforcement members 44 and 45 are provided.

This makes it possible to prevent a human, including the worker S, from entering from the transporting section 11 and coming into contact with the transferring section 12. As a result, it is possible to improve the safety of the transfer system 1. Furthermore, since the rear guard parts 41 are provided so as to be adjacent to the transporting section 11, it is possible to suppress an increase, due to provision of the rear guard parts 41, in the space in which the transfer system 1 is disposed.

The front guard part 24, the side guard parts 21, and the rear guard parts 41 in accordance with the present embodiment are each provided with a corresponding one(s) of the transparent plates 22, 31, 35, and 42 as substantial guards. Thus, in the present embodiment, it is possible for the worker S of the transfer system 1 to monitor, as a monitor, the transporting section 11 and the transferring section 12 from the outside of the transfer system 1. Note that, in place of each of the transparent plates 22, 31, 35, and 42, a fence, a net, or another type of guard may be used.

Motions of Transferring Section and Transporting Section

In the transfer system 1 configured as described above, the control section 15 first instructs the carry-in conveyors 11*a* and 11*b* of the transporting section 11 to carry in the first container 17 and the second container 18, respectively, from the rear side in the Y direction toward the front end in the Y direction and to continue such transport. The control section 15 also instructs the carry-out conveyors 11*c* and 11*d* of the transporting section 11 to carry out the first container 17 and the second container 18 from a front end portion in the Y direction toward the rear side in the Y direction and to continue such transport.

Next, the control section 15 instructs the moving mechanism 11*e* of the transporting section 11 to move the first container 17 and the second container 18. This causes the moving mechanism 11*e* to move the first container 17 and the second container 18, which have been carried in, to the first transfer position P1 and the second transfer position P2, respectively. The control section 15 then instructs the transferring section 12 to carry out a transfer on the basis of images of the first container 17 and the second container 18 which images have been captured by the camera section 13. Accordingly, the transferring section 12 holds the article 2 housed in the first container 17 at the first transfer position P1, and transfers the article 2 to the second container 18 at the second transfer position P2.

Next, the control section 15 instructs the moving mechanism 11*e* of the transporting section 11 to move the first container 17. This causes the moving mechanism 11*e* to (i) move the first container 17 at the first transfer position P1 to the carry-out conveyor 11*c* and (ii) move, to the first transfer position P1, a subsequent first container 17 that has been carried in. The first container 17 that has been moved to the carry-out conveyor 11*c* is carried out toward the rear side in the Y direction.

By the control section 15 repeating the instruction to move the first container 17 and the instruction to transfer the first container 17, a desired article 2 is housed in the second container 18. The control section 15 then instructs the moving mechanism 11*e* of the transporting section 11 to move the first container 17 and the second container 18. Thus, the first container 17 at the first transfer position P1 is moved to the carry-out conveyor 11*c*, and the second container 18 at the second transfer position P2 is moved to the carry-out conveyor 11*d*. The first container 17 that has been moved to the carry-out conveyor 11*c* and the second container 18 that has been moved to the carry-out conveyor 11*d* are carried out toward the rear side in the Y direction.

Details of Control in Transfer System 1

Figure 3:
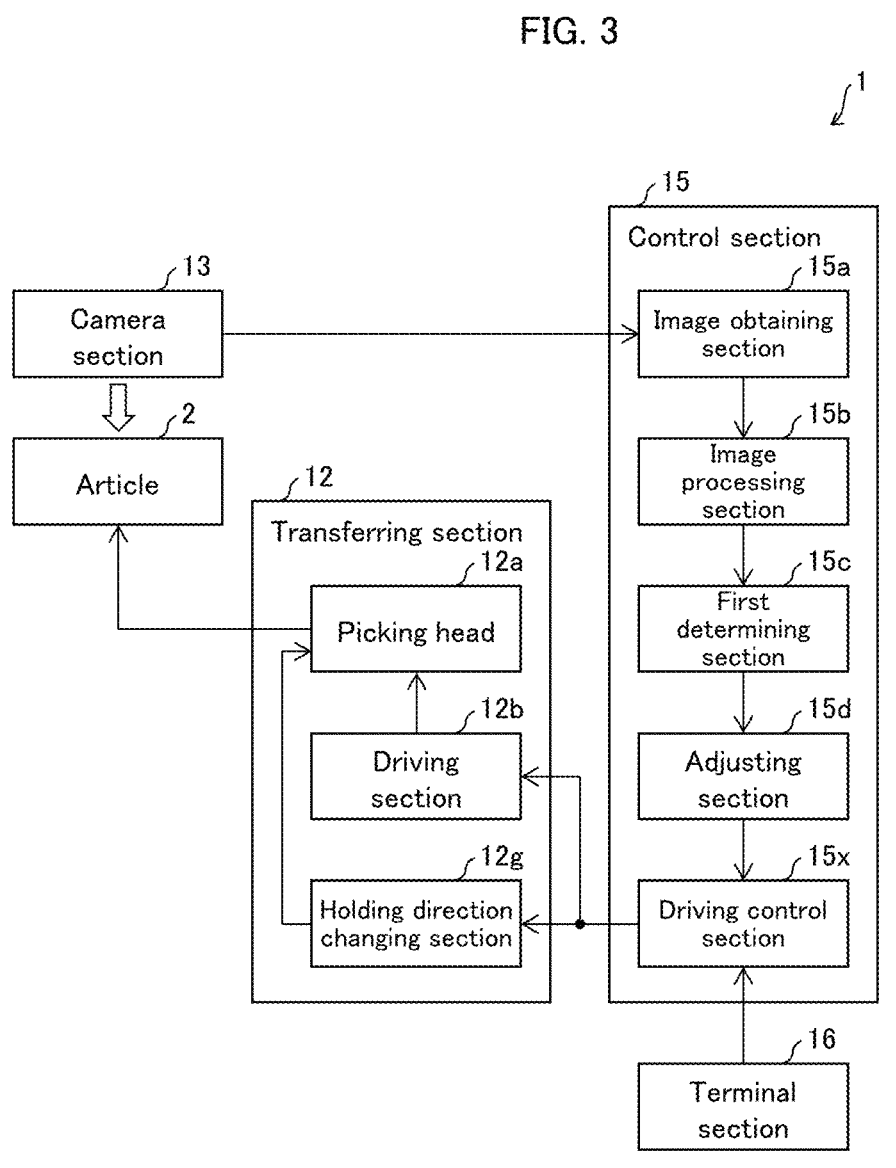

FIG. 3 is a functional block diagram illustrating the outline of the transfer system 1 in accordance with the present embodiment. As has been described, the transfer system 1 includes the transferring section 12, the camera section 13, the control section 15, and the terminal section 16. In the transfer system 1, the article 2 in the first container 17 is transferred by the transferring section 12. In the transfer system 1, in a case where it is determined, on the basis of a posture of the article 2 placed in the first container 17, that the article 2 cannot be transferred as it is, the article 2 is reset so that the article 2 can be transferred. This is described below in detail.

The camera section 13 generates a captured image by capturing an image of the first container 17 at the first transfer position P1. The camera section 13 transmits, to the control section 15, captured image data that indicates the captured image.

The control section 15 includes an image obtaining section 15*a*, an image processing section 15*b*, a first determining section 15*c*, an adjusting section 15*d*, and a driving control section 15*x*.

The image obtaining section 15*a* obtains, from the camera section 13, the captured image data that indicates the captured image of the article 2 housed in the first container 17. The image obtaining section 15*a* sends, to the image processing section 15*b*, the obtained captured image data.

The image processing section 15*b* carries out image processing with respect to the captured image so as to obtain article image data that pertains to the article 2 and that is used to determine whether or not the article 2 can be transferred. The image processing section 15*b* sends the obtained article image data to the first determining section 15*c*. The article image data is data that pertains to a part of the captured image which part indicates the article 2. Note that the image processing section 15*b* may be constituted by a distance image sensor that can also obtain a distance or may include a distance measurement sensor other than an image sensor. This makes it possible to obtain distance data as well as the article image data. Note that the distance data may be such that an image indicated by the article image data is divided into given sections and a distance from the camera section 13 is indicated for each section.

The first determining section 15*c* determines whether or not the transferring section 12 can hold and transfer the article 2, on the basis of the article image data and data (a shape, a vertical length, a horizontal length, a height, etc.) that pertains to the article 2 and that is stored in advance. For example, the first determining section 15*c* may carry out the determination, on the basis of whether or not a holdable surface of the article 2 is at an angle equal to or narrower than a given angle with respect to a horizontal surface. Note that the holdable surface is a surface which has been determined in advance and on which the picking head 12*a* can hold the article 2. The given angle is, for example, 45 degrees. The holdable surface is, for example, a surface that is wider than a given area, out of surfaces of the article 2. The given area is, for example, an area that allows all suction pads included in the picking head 12*a* to adhere to article 2 by suction at the same time.

The first determining section 15*c* may also carry out the determination on the basis of whether or not another article 2 overlaps at least a part of the article 2 that is a determination target.

The first determining section 15*c* then sends a result of the determination to the adjusting section 15*d*. Details of the determination made by the first determining section 15*c* are described later.

In a case where the first determining section 15*c* determines that the article 2 cannot be transferred, the adjusting section 15*d* sends, to the driving control section 15*x*, an instruction for resetting the article 2. Specifically, the adjusting section 15*d* sends, to the driving control section 15*x*, an instruction to reset the article 2 so that the posture and a position, in the first container 17, of the article 2 that cannot be transferred as it is become a posture and a position that allow the article 2 to be transferred.

For example, in a case where, since a holdable surface of a target article 2 that is a determination target is not at an angle equal to or narrower than the given angle with respect to the horizontal surface, the first determining section 15*c* determines that the target article 2 cannot be transferred, the adjusting section 15*d* may cause (i) a holding direction to be adjusted to a direction perpendicular to the holdable surface of the target article 2 and (ii) a posture and a position of the target article 2 to be adjusted.

For example, as illustrated in 1002 of FIG. 10 (described later), in a case where the holdable surface of the article 2 is not at an angle equal to or narrower than the given angle with respect to the horizontal surface, the adjusting section 15*d* causes (i) a direction in which the transferring section 12 is held to be adjusted to a direction perpendicular to the holdable surface of the article 2, (ii) the transferring section 12 to hold the article 2, and (iii) the posture and the position of the article 2 to be adjusted.

In a case where the picking head 12*a* includes a plurality of suction pads (suction members) and in a case where the holdable surface of the target article 2 is not at an angle equal to or narrower than the given angle with respect to the horizontal surface, the adjusting section 15*d* may cause (i) at least a part of the plurality of suction pads of the picking head 12*a* to adhere to the holdable surface by suction and (ii) the posture and the position of the article 2 to be adjusted.

In a case where, since another article 2 overlaps a part of the target article 2 that is a determination target, the first determining section 15*c* determines that the target article 2 cannot be transferred, the adjusting section 15*d* may cause the posture and the position of the target article 2 to adjusted, by causing the picking head 12a to (i) hold the holdable surface of the target article 2, (ii) be raised in the vertical direction, and (iii) be moved in a direction opposite from the another article 2.

The driving control section 15x controls the driving section 12b so that the picking head 12a holds and transfers the article 2. The driving control section 15x causes (i) the picking head 12a to temporarily hold the article 2 and (ii) the posture of the article 2 and the position of the article 2 in the first container 17 to be changed, in accordance with the instruction given by the adjusting section 15d.

The terminal section 16 sends an instruction of the worker S to the control section 15 so that the transferring section 12 is driven. For example, in a case where the worker S inputs, into the terminal section 16, an instruction to transfer the article 2 from the first container 17 to the second container 18, the terminal section 16 sends the instruction to the control section 15, and the control section 15 drives the transferring section 12 so that the instruction given by the worker S is carried out.

The transferring section 12 includes a holding direction changing section 12g in addition to the picking head 12a and the driving section 12b described above. The holding direction changing section 12g changes the direction in which the picking head 12a is held. In a case where the vertical direction is regarded as 0 degree, such a holding direction can be changed from −85 degrees to +85 degrees. Note that the above angle of the holding direction is an example, and may be wider than the above angle or may be narrower than the above angle.

Figure 4:
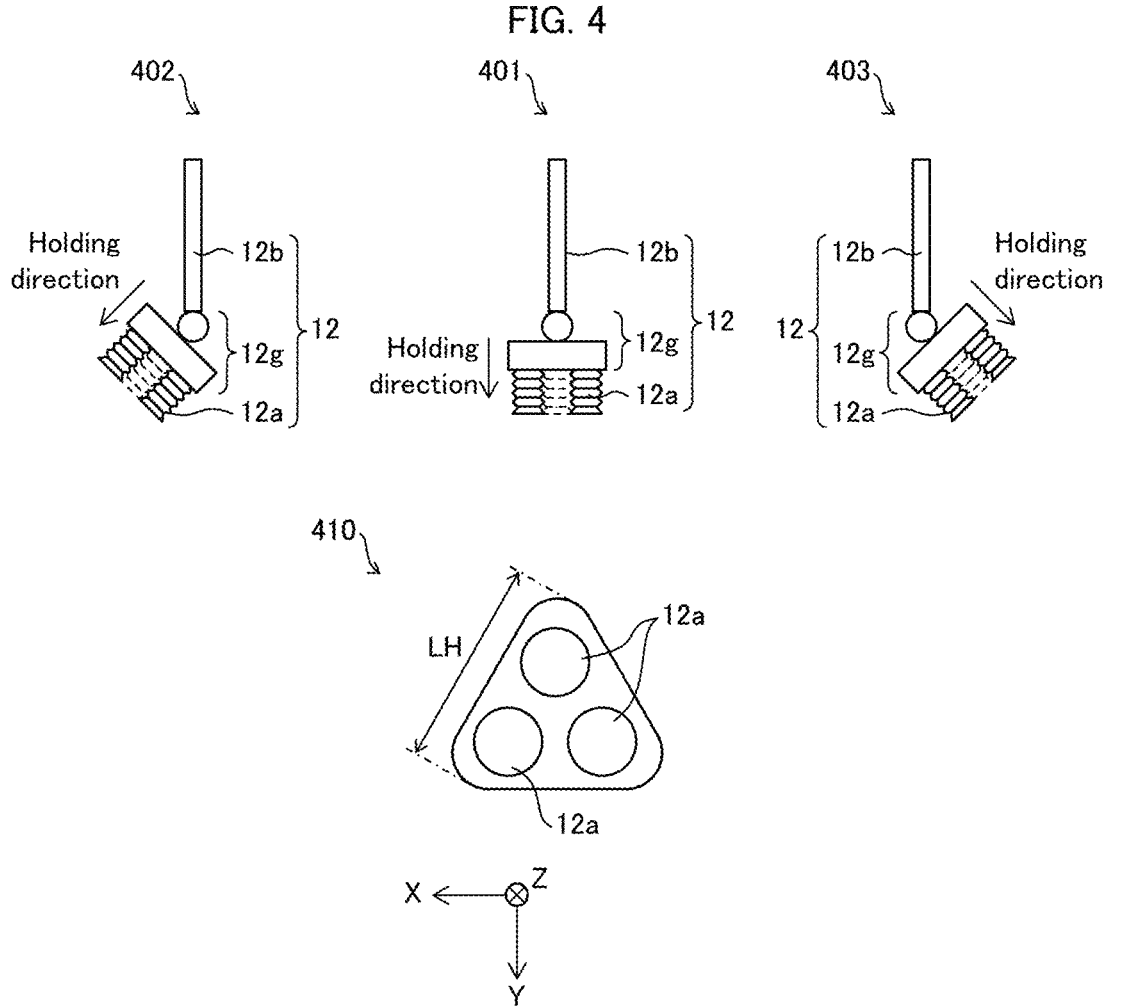
FIG. 4 is a drawing schematically illustrating the shape of a transferring section.

FIG. 4 is a drawing schematically illustrating a shape of the transferring section 12. As illustrated in 401 of FIG. 4, the transferring section 12 has such a shape that the holding direction changing section 12g is provided between the driving section 12b and the picking head 12a. In a case where a direction of the picking head 12a is changed by the holding direction changing section 12g as illustrated in 402 and 403 of FIG. 4, the holding direction is changed.

As an example, the picking head 12a may include three suction pads and, as illustrated in 410 of FIG. 4, the three suction pads may be disposed at respective positions near the vertices of a triangle, as viewed from the −Z direction.

Details of Process in First Determining Section 15c

Figure 5:
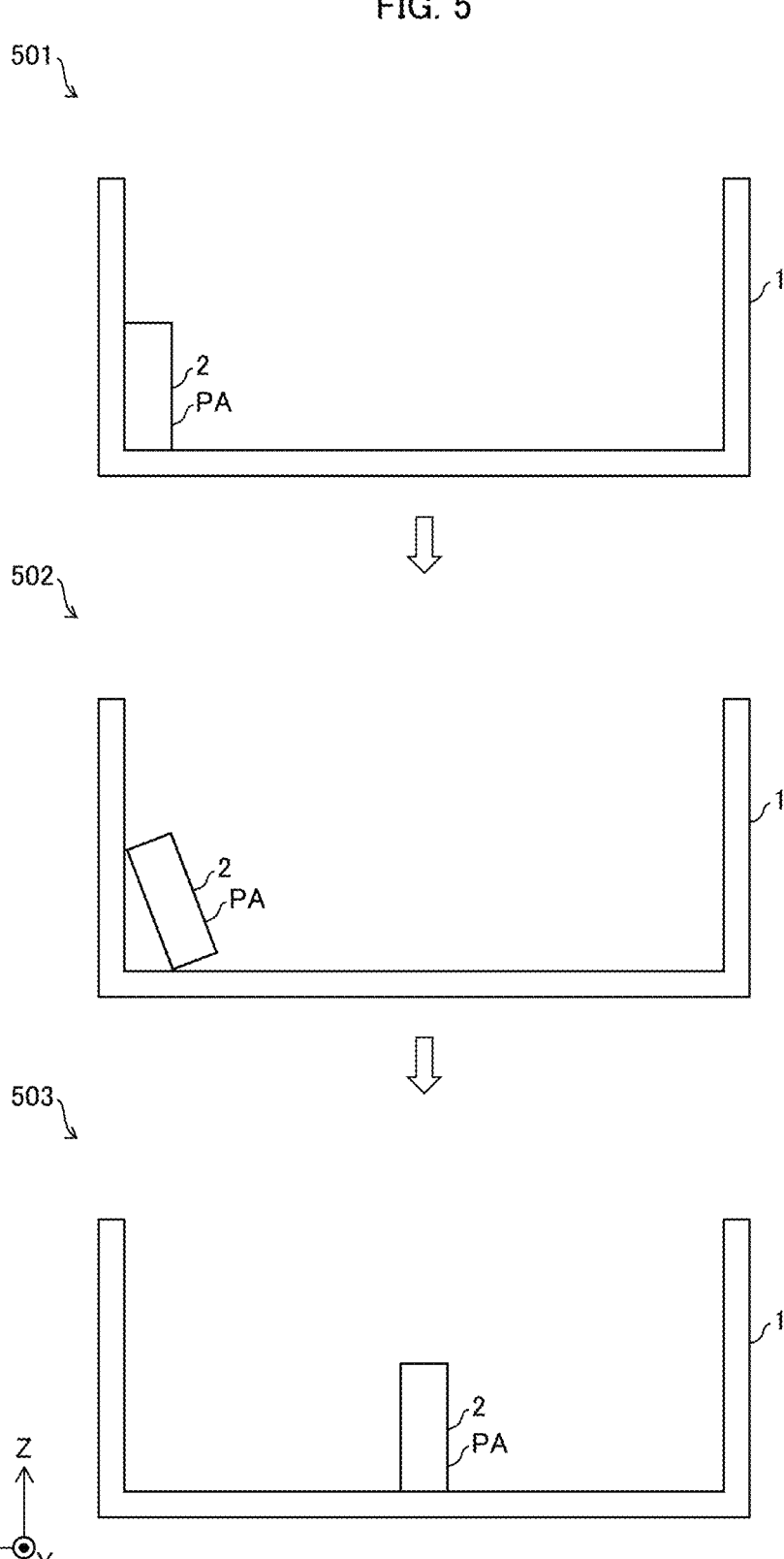
FIG. 5 is a drawing illustrating an example of a case where an article cannot be transferred.
Figure 6:
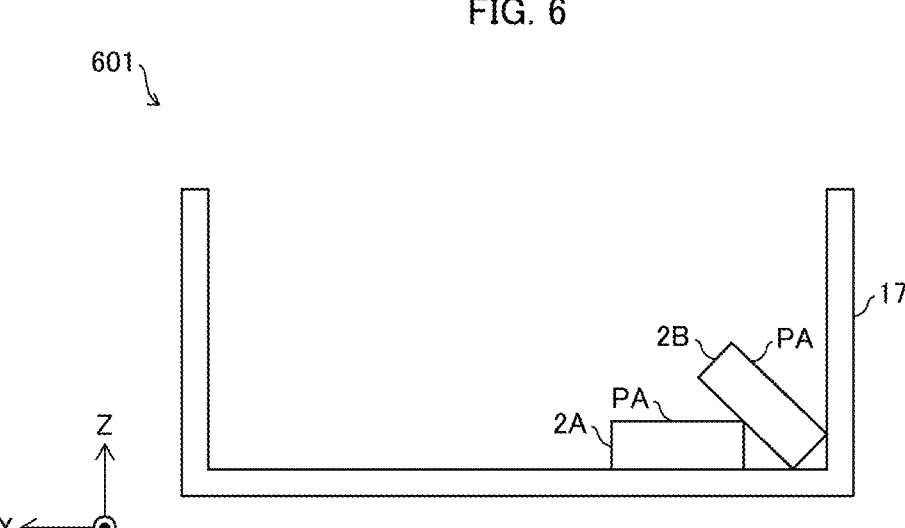
FIG. 6 is a drawing illustrating an example of a case where an article cannot be transferred.

Next, with reference to FIGS. 5 and 6, details of the process in the first determining section 15c are described. FIGS. 5 and 6 are each a drawing illustrating an example(s) of a case where the article 2 cannot be transferred. Note that, here, the article 2 is assumed to have a rectangular parallelepiped shape.

The case where the article 2 cannot be transferred indicates a state where, although at least a part of the suction pads included in the picking head 12a can be caused to adhere to the article 2 by suction and hold the article 2, the article 2 cannot be transferred safely as it is.

Hereinafter, described below as an example is a case where the article 2 cannot be transferred unless the picking head 12a is caused to adhere, by suction, to a given position (e.g., a substantially central position) on the holdable surface (surface PA) of the article 2.

In this case, there is a case where the article 2 is in an upright state (a state of being vertically placed) (501, 503) or in a substantially upright state (502), as illustrated in 501 to 503 of FIG. 5. In this case, the picking head 12a cannot be caused to directly adhere to the given position on the surface PA by suction. Therefore, the first determining section 15c determines that the article 2 cannot be transferred as it is in this posture.

Further, there is a case where another article 2 lies on a certain article 2 and therefore the picking head 12a cannot be caused to adhere, by suction, to the given position on a surface PA of the another article 2 that lies on the certain article 2. For example, as illustrated in 601 of FIG. 6, there is a case where an article 2B lies on an article 2A and is close to a side wall of the first container 17. In this case, the picking head 12a cannot be caused to adhere, by suction, to any of a surface PA of the article 2A and a surface PA of the article 2B. Therefore, the first determining section 15c determines that the article 2 (2A, 2B) cannot be transferred.

More details are as follows. First, the first determining section 15c determines whether or not the image which is indicated by the article image data indicates a single article 2 or a plurality of articles 2. This determination can be made by comparing (i) the area of each surface of the article 2 which area can be ascertained from shape data that pertains to the article 2 and that is stored in advance and (ii) the area indicated by the image of the article(s) 2. The article image data indicates the image that has been obtained by capturing the image of the first container 17 from the +Z direction. Therefore, in a case where the area indicated by the image of the article(s) 2 is larger than the area of the widest surface of the article 2 in the shape data, the image indicates a plurality of articles 2.

Then, in a case where the first determining section 15c determines that the image indicates a single article 2, the first determining section 15c next determines whether or not the area indicated by the image of the article 2 is the same as the area of a surface, other than the widest surface, of the article 2 in the shape data. In a case where the area indicated by the image of the article 2 is the same as the area of the surface, other than the widest surface, of the article 2 in the shape data, it can be recognized that the article 2 in the article image data is in a state of being vertically placed (state in 501 or 503 of FIG. 5). In this case, the first determining section 15c determines that the article 2 cannot be transferred as it is.

In a case where the area of the article 2 in the article image data is the same as the area of the widest surface of the article 2 in the shape data, it can be recognized that the article 2 in the article image data is in a state of being placed flat. In this case, the first determining section 15c determines that the article 2 can be transferred as it is.

In a case where the area of the article 2 in the article image data is smaller than the area of the widest surface of the article 2 in the shape data and larger than the area of each of the other surfaces of the article 2, it can be recognized that the article 2 in the article image data is in a state of being leaned against the side wall of the first container 17 (state in 502 of FIG. 5). In this case, the first determining section 15c determines that the article 2 cannot be transferred as it is.

In a case where the first determining section 15c determines that the image indicates a plurality of articles 2, the first determining section 15c ascertains an overlapping state of the plurality of articles 2 also with use of the above-described distance data.

The distance data is such that the image indicated by the article image data is divided into given sections and a distance from the camera section 13 is indicated for each section. Therefore, in a case where the distance between the camera section 13 and each of the articles 2 can be ascertained for each section, it is possible to recognize in what postures the articles 2 overlaps each other. The first determining section 15c determines that the articles 2 cannot be transferred, in a case where postures of the articles 2 and the manner in which the articles 2 overlaps each other are as follows.

(1) A lower article 2 is in a state of being vertically placed.

(2) The shortest distance between an upper article 2 and a side surface of the first container 17 is equal to or shorter than a given value.

Note that the case where the article 2 cannot be transferred unless the picking head 12a is caused to adhere, by suction, to the given position (e.g., a substantially central position) on the holdable surface (surface PA) of the article 2 has been described as an example. However, the present invention is not limited to this example. For example, in a case where, in addition to the surface PA, a surface perpendicular to the surface PA is also a holdable surface and in a case where the picking head 12a cannot be caused to adhere to the given position on each of these surfaces by suction, it is determined that the article 2 cannot be transferred.

Details of Resetting Process Carried Out by Adjusting Section 15d

Figure 7:
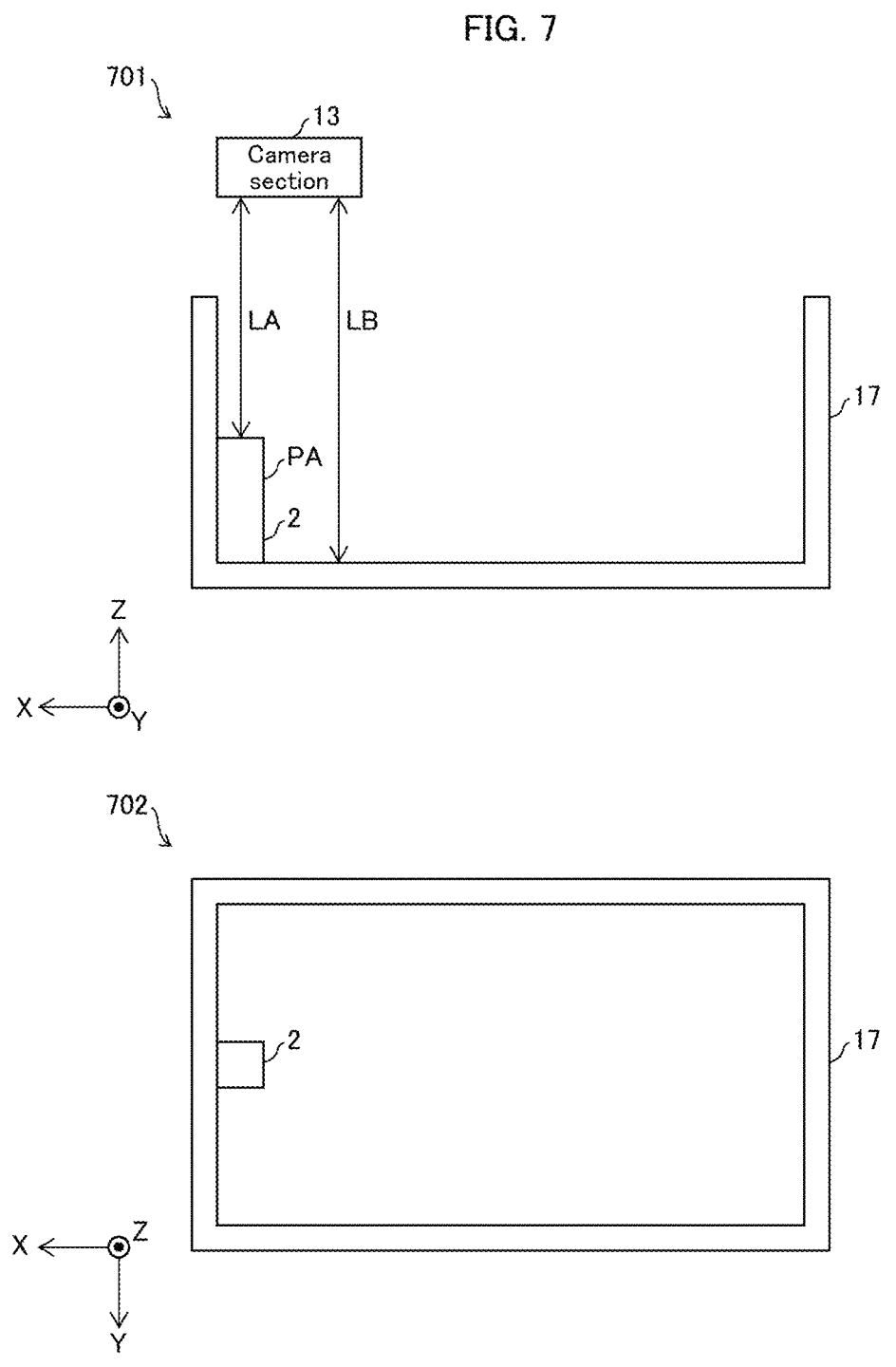
Figure 8:
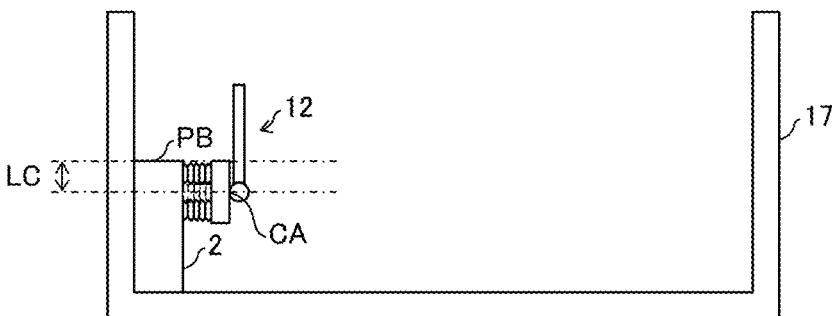
FIG. 8 is a drawing for describing a method of resetting an article.
Figure 9:
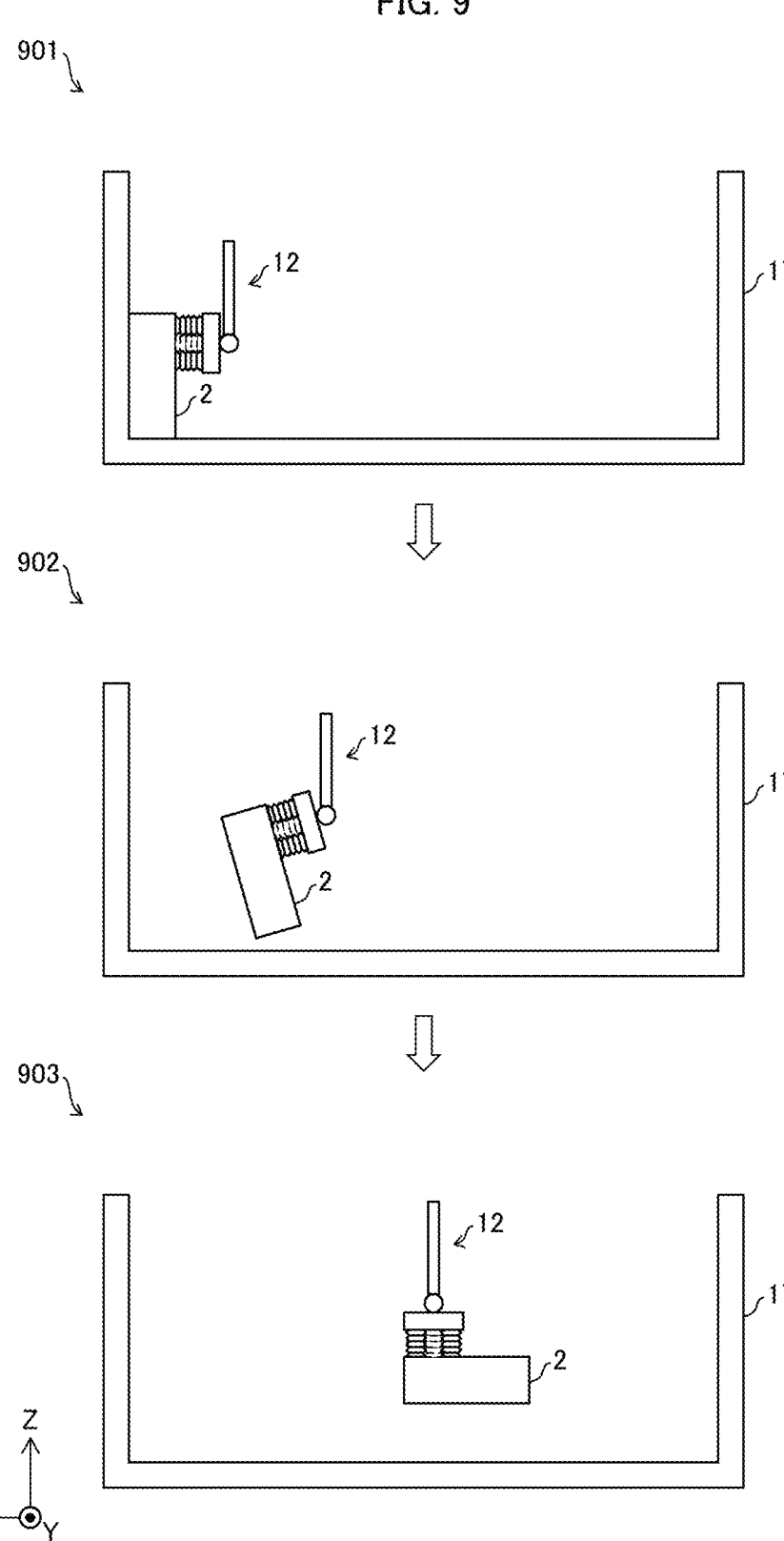
FIG. 9 is a drawing for describing a method of resetting an article.

Next, a process that is carried out in a case where the article 2 is reset in accordance with the instruction given by the adjusting section 15d is described with reference to FIGS. 7 to 11. FIGS. 7 to 9 are each a drawing schematically illustrating the process that is carried out in a case where the article 2 is reset. Here, a case where the article 2 is upright along the side surface of the first container 17 is described.

701 of FIG. 7 is a drawing illustrating a state where the article 2 is placed in the first container 17, as viewed from the +Y direction. 702 of FIG. 7 is a drawing illustrating the same state as viewed from the +Z direction.

The adjusting section 15d can recognize the position and the posture of the article 2 from the article image data generated by the image processing section 15b. Thus, the adjusting section 15d can recognize that the article 2 is in an upright posture. The adjusting section 15d can also recognize, from the distance data, a distance LA from the camera section 13 to the article 2 and a distance LB from the camera section 13 to a bottom surface of the first container 17.

The adjusting section 15d which has recognized, from the article image data, that the article 2 is upright controls the transferring section 12 so that the direction in which the picking head 12a is held becomes a direction substantially perpendicular to the surface PA which is the holdable surface of the article 2 (FIG. 8). The adjusting section 15d then controls the transferring section 12 so that the center CA of the picking head 12a is located at a position that is shifted toward the bottom surface of the first container 17 by a given distance LC from a surface PB, an image of which can be captured by the camera section 13, of the article 2.

For example, in a case where a length LH (see 410 of FIG. 4) of one side of the holding direction changing section 12g provided with the picking head 12a is 25 mm, the given distance LC is approximately 22.5 mm (=25/2+10). This makes it possible to cause at least a part of the suction pads included in the picking head 12a to adhere to the holdable surface by suction while maintaining a given margin (10 mm).

Then, the adjusting section 15d causes the surface PA of the article 2 to be held as illustrated in 901 of FIG. 9, causes the article 2 to be moved in a state where the surface PA of the article 2 is held (902), and causes the article 2 to be placed on the bottom surface of the first container 17 such that the surface PA of the article 2 becomes horizontal (903).

This causes the article 2 to be placed in a state where the surface PA of the article 2 is located on a transferring section 12 side. Thus, it is possible to reset the article 2, which has been placed in a state where the article 2 cannot be transferred, so that the article 2 is in a state where the article 2 can be transferred.

Figure 10:
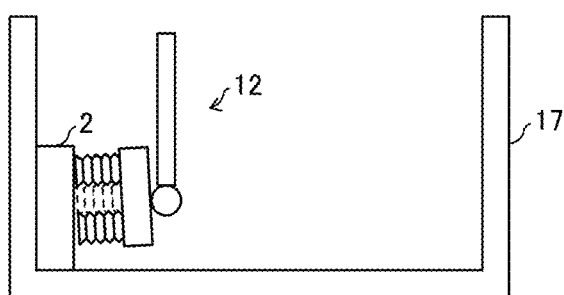
FIG. 10 is a drawing illustrating an example of a hold in a case where an article is reset.
Figure 10:
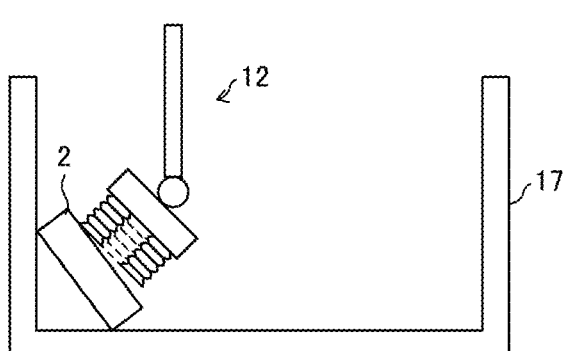
Figure 10:
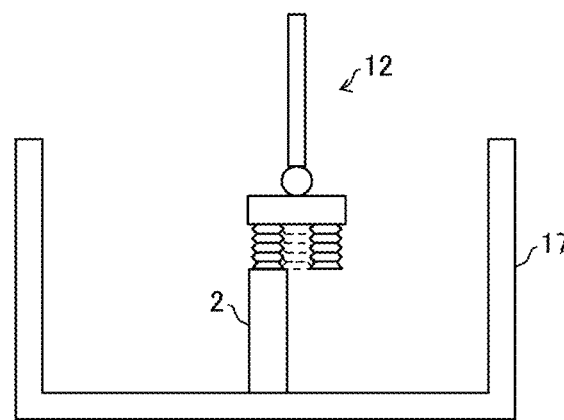

FIG. 10 illustrates an example of a hold in a case where the article 2 that is placed in a state where the article 2 cannot be transferred is temporarily held in order to reset the article 2. 1001 of FIG. 10 illustrates an example of a hold in a case where the article 2 is upright in the first container 17 along the side wall of the first container 17. 1002 of FIG. 10 illustrates an example of a hold in a case where the article 2 leans against the side wall of the first container 17 and is in a substantially upright state. 1003 of FIG. 10 illustrates an example of a hold in a case where the article 2 is upright in the first container 17. In the cases of 1001 and 1002, the picking head 12a is caused to adhere to the surface PA of the article 2 by suction and hold the article 2. In 1003, at least one of the suction pads included in the picking head 12a is caused to adhere to the surface PB of the article 2 by suction and hold the article 2. By thus holding the article 2, it is possible to change the posture and the position of the article 2 and place the article 2 in a state where the article 2 can be transferred.

Figure 11:
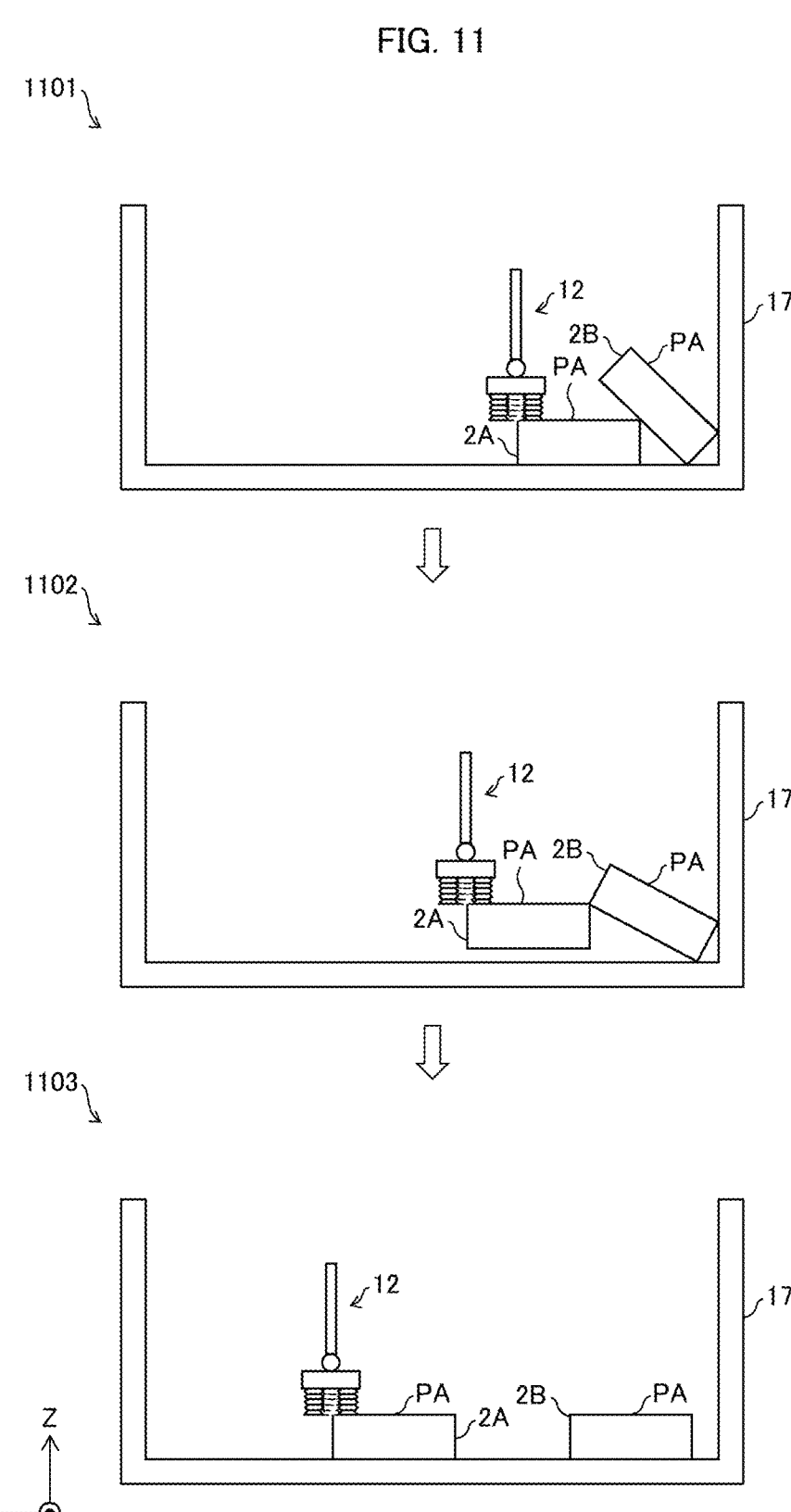
FIG. 11 is a drawing illustrating an example of hold in a case where an article is reset.

FIG. 11 illustrates an example of a hold in a case where, when the article 2B lies on the article 2A and is close to the side wall of the first container 17, the article 2A is temporarily held in order to reset the article 2A. In this case, at least a part of the suction pads included in the picking head 12a is caused to adhere to the surface PA of the article 2A by suction (1101 in FIG. 11). Then, the article 2A is moved in a direction away from the article 2B (1102 in FIG. 11). In a case where the article 2A is moved as it is in the direction away from the article 2B, the articles 2A and 2B are each placed such that the surface PA is horizontal (1103 in FIG. 11). Thus, the articles 2A and 2B which have been placed in a state where the articles 2A and 2B cannot be transferred can be placed in a state where the articles 2A and 2B can be transferred.

Flow of Process in Transfer System 1

Figure 12:
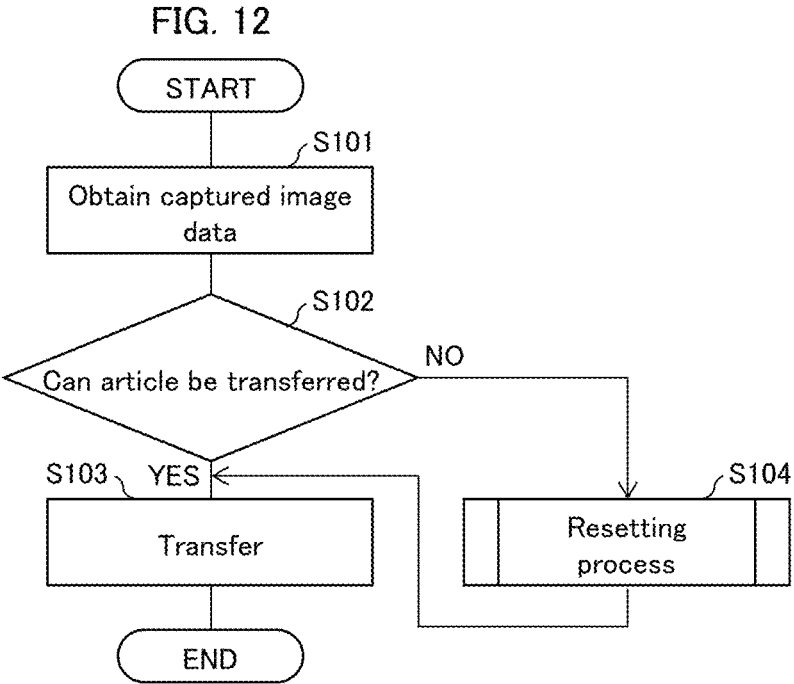
FIG. 12 is a flowchart illustrating a flow of a process in the transfer system.
Figure 13:
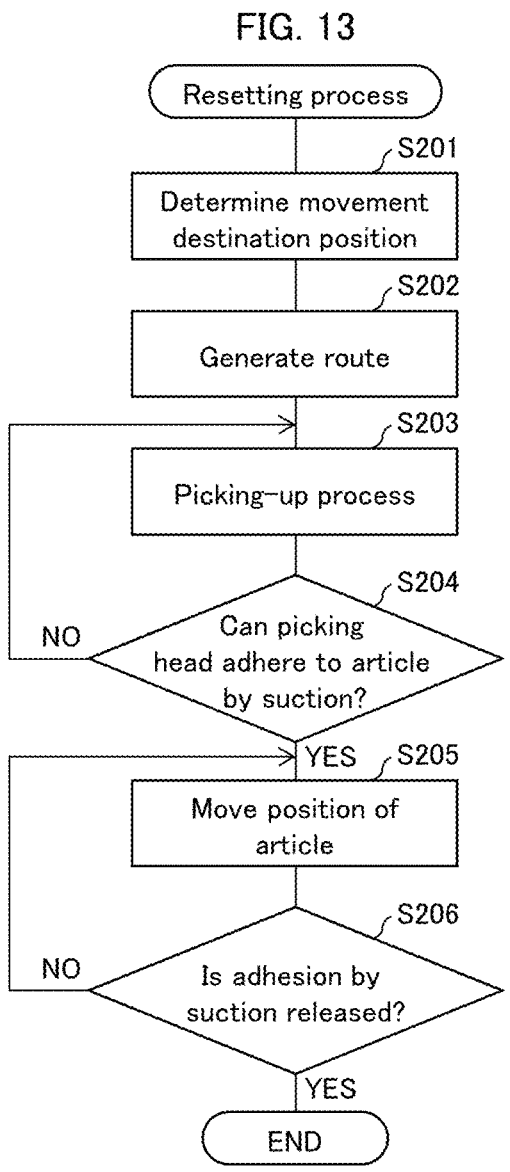
FIG. 13 is a flowchart illustrating a flow of a process in the transfer system.

Next, a flow of a process in the transfer system 1 is described with reference to FIGS. 12 and 13. FIGS. 12 and 13 are each a flowchart illustrating the flow of the process in the transfer system 1. Note that, here, out of processes in the transfer system 1, only the process that is carried out in a case where the article 2 is reset is described.

As illustrated in FIG. 12, in the transfer system 1, first, the camera section 13 captures an image of an inside of the first container 17 (S101). The first determining section 15c then determines whether or not the article 2 can be transferred, on the basis of a state of the article 2 in the first container 17 the image of which has been captured by the camera section 13 (S102: determining step). In a case where the article 2 is in a state where the article 2 can be transferred (YES in S102), the article 2 is transferred as it is (S103). In a case where the article 2 is in a state where the article 2 cannot be transferred (NO in S102), the adjusting section 15d carries out a process of resetting the article 2 (S104: adjusting step). After the resetting process, the article 2 is transferred (S103).

Resetting Process

Next, the resetting process in the step S104 is described with reference to FIG. 13. In the reset process, the adjusting section 15d first determines a position of a destination to which the article 2 that is a reset target is to be moved (S201). The adjusting section 15d searches the bottom surface in the first container 17 for a region in which nothing is placed such that the article 2 can be placed flat. Then, the adjusting section 15d determines, in the region, such a movement destination position. The adjusting section 15d subsequently determines a route along which the article 2 is moved from a current position to the movement destination position (S202). The adjusting section 15d that has determined such a movement route and the movement destination position instructs the driving control section 15x to cause the article 2 to be moved to the movement destination along the movement route. The driving control section 15x that has received an instruction controls the transferring section 12 so that the transferring section 12 picks up the article 2 (S203). In a case where the transferring section 12 can pick up the article 2 successfully, i.e., the picking head 12a of the transferring section 12 can adhere to the article 2 by suction (YES in S204), the driving control section 15x controls the transferring section 12 to move the article 2 to the determined movement destination position along the determined movement route (S205). On the other hand, in a case where the transferring section 12 cannot pick up the article 2 successfully (NO in S204), the driving control section 15x controls the transferring section 12 to carry out a pick-up process again (S203).

In a case where the article 2 is moved to the movement destination position under control carried out by the driving control section 15x, the article 2 is placed on the bottom surface of the first container 17, and the adhesion of the picking head 12a by suction is released (YES in S206). This completes the process of resetting the article 2.

As has been described above, the transfer system 1 in accordance with the present embodiment includes the transferring section 12 that transfers the article 2 from the first container 17 to the outside of the first container 17. The transferring section 12 includes: the picking head 12a that holds the article 2 by adhering to the article 2 by suction, the driving section 12b that drives the picking head 12a in the horizontal direction and the vertical direction, and the holding direction changing section 12g that changes the direction in which the picking head 12a is held.

The transfer system 1 further includes the camera section 13, the first determining section 15c, and the adjusting section 15d. The camera section 13 captures the image of the article 2 in the first container 17. The first determining section 15c determines whether or not the transferring section 12 can hold and transfer the article 2, on the basis of the posture of the article 2 the image of which has been captured by the camera section 13. In a case where the first determining section 15c determines that the article 2 cannot be transferred, the adjusting section 15d controls the driving section 12b and the holding direction changing section 12g of the transferring section 12 so that the posture and the position of the article 2 are adjusted to a posture and a position which allow the transferring section 12 to hold and transfer the article 2.

Embodiment 2

Another embodiment of the present invention will be described below. Note that, for convenience, members having functions identical to those of the members described in the above embodiment will be given the same reference signs, and description thereof will not be repeated.

Figure 14:
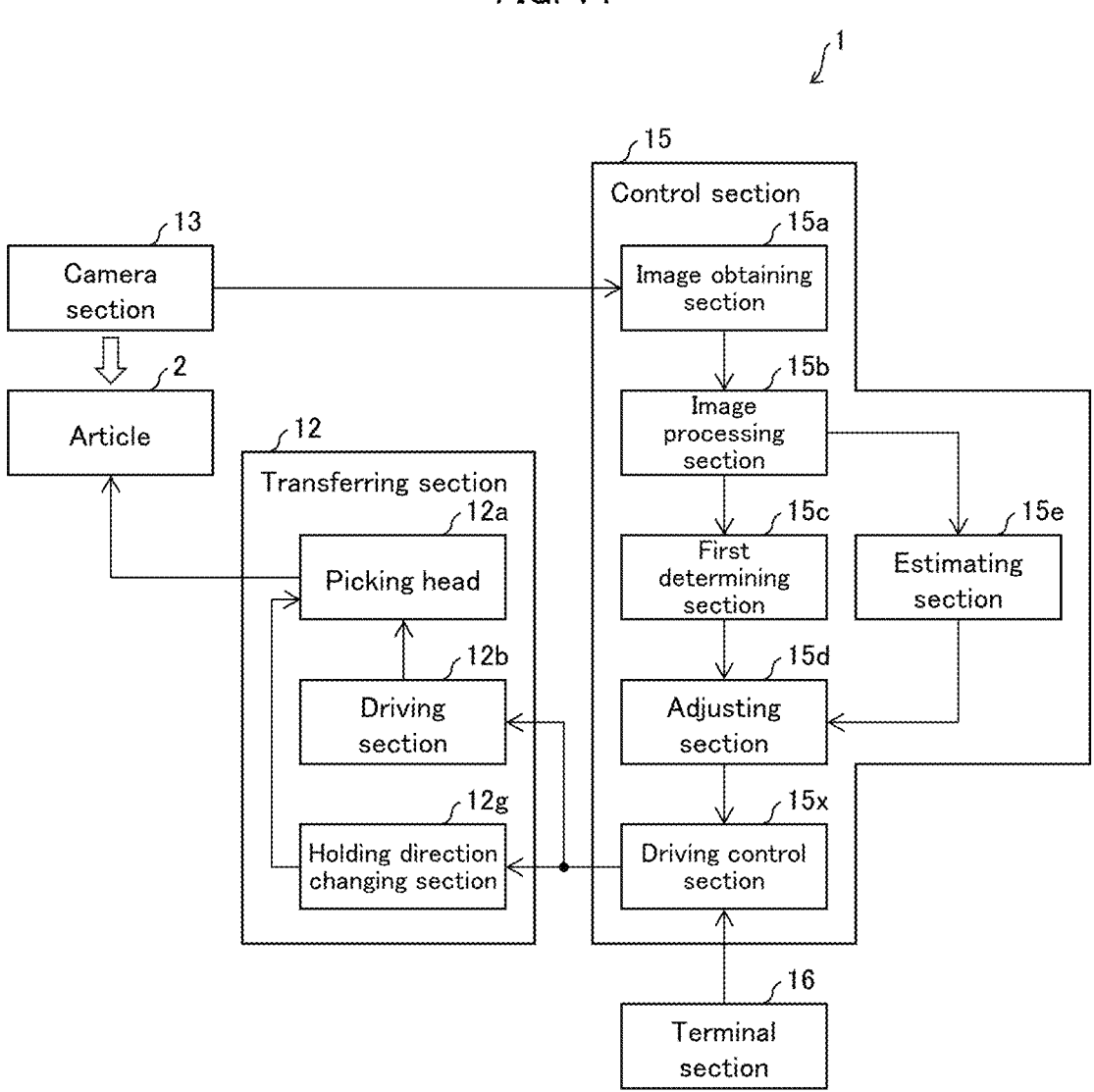
FIG. 14 is a functional block illustrating an outline of a transfer system in accordance with another embodiment of the present invention.

The present embodiment is configured by adding an estimating section 15e to the control section 15 in Embodiment 1. FIG. 14 is a functional block diagram illustrating an outline of a transfer system 1 in accordance with the present embodiment.

As illustrated in FIG. 14, a control section 15 includes the estimating section 15e. The estimating section 15e estimates in what direction a holdable surface of an article 2 faces, on the basis of article image data that has been generated by an image processing section 15b. The estimating section 15e then sends the estimated direction of the surface to an adjusting section 15d.

Figure 15:
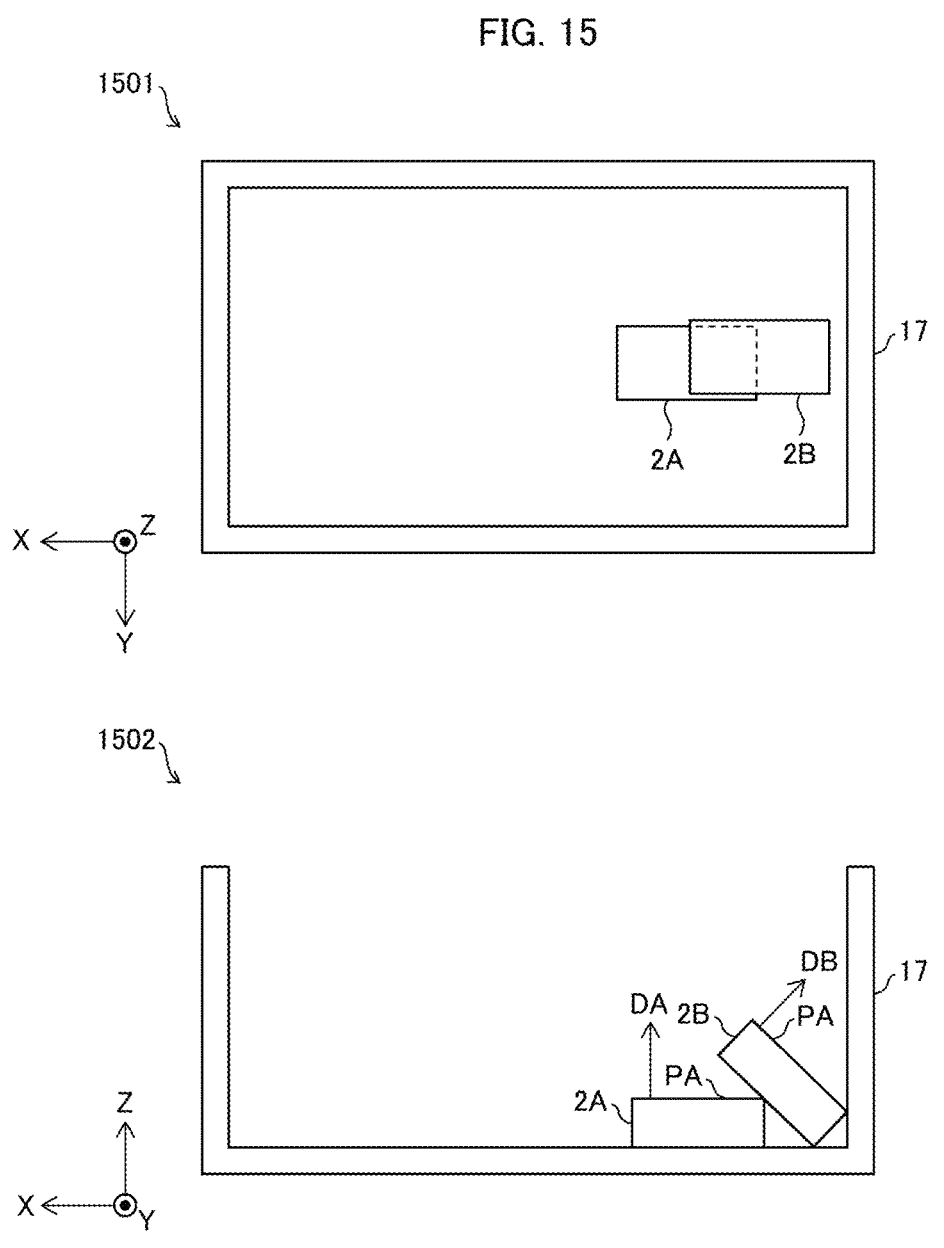

Description is given with reference to FIG. 15. FIG. 15 is a drawing illustrating directions of holdable surfaces of articles 2. Article image data generated by the image processing section 15b indicates a shape and a position of each of the articles 2. Distance data indicates distances to the articles 2 for each section. Therefore, in a case where there is the article image data as illustrated in, for example, 1501 of FIG. 15, the estimating section 15e can recognize that two articles 2 (articles 2A and 2B) are indicated by the article image data and a relationship between the two articles 2 is as illustrated in 1502 of FIG. 15. From this, the estimating section 15e can estimate that the holdable surface of the article 2A faces a vertical direction (direction DA) and the holdable surface of the article 2B faces a direction which is shifted from the vertical direction toward a side surface of a first container 17 (direction DB).

The adjusting section 15d that has received the directions of the holdable surfaces from the estimating section 15e can instruct a driving control section 15x so that a picking head 12a of a transferring section 12 can adhere to the article 2A by suction in accordance with the direction of the surface PA of the article 2A.

In a case where the articles 2A and 2B are placed at the center of the first container 17 or in a vicinity thereof such that the articles 2A and 2B overlap each other, the article 2B can also be reset. In this case, the adjusting section 15d that has received the direction DB of the holdable surface PA of the article 2B from the estimating section 15e can instruct the driving control section 15x so that the picking head 12a of the transferring section 12 can adhere to the article 2B by suction in accordance with the direction (direction DB) of the surface PA of the article 2B.

Embodiment 3

Still another embodiment of the present invention will be described below. Note that, for convenience, members having functions identical to those of the members described in the above embodiments will be given the same reference signs, and description thereof will not be repeated.

Figure 16:
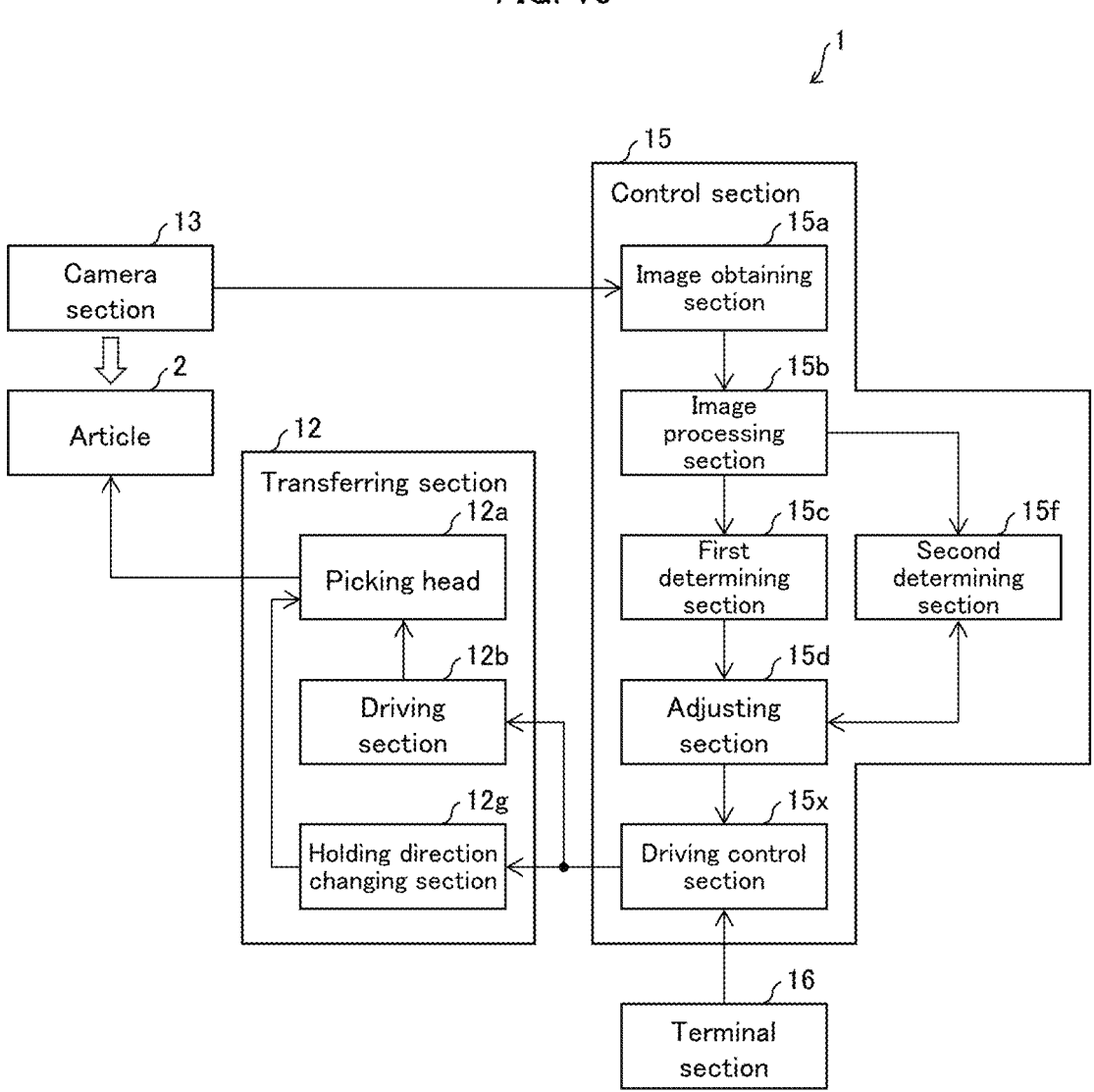
FIG. 16 is a functional block illustrating an outline of a transfer system in accordance with still another embodiment of the present invention.

The present embodiment is configured by adding a second determining section 15f to the control section 15 in Embodiment 1 or 2. FIG. 16 is a functional block diagram illustrating an outline of a transfer system 1 in accordance with the present embodiment.

As illustrated in FIG. 16, a control section 15 includes the second determining section 15f. The second determining section 15f determines whether or not another article 2 or the like that interferes with movement of an article 2, i.e., another article 2 that interferes with adjustment carried out by an adjusting section 15d, is present in a movement route and/or at a movement destination position which have been determined by the adjusting section 15d. The second determining section 15f then sends a result of the determination to the adjusting section 15d.

In a case where the second determining section 15f determines that another article 2 that interferes with the movement of the article 2 is present in the determined movement route and/or at the determined movement destination position, the adjusting section 15d cancels the determined movement route and/or the determined movement destination position, and determines the movement route and/or the movement destination position again.

Figure 17:
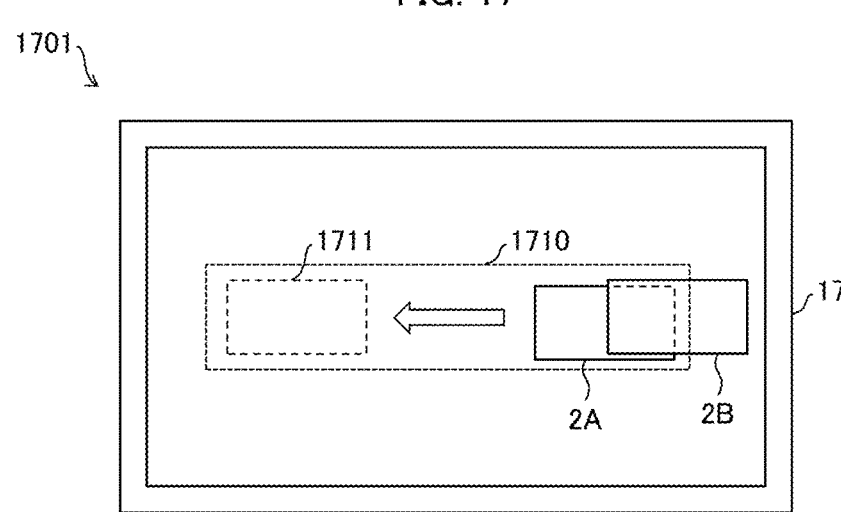
FIG. 17 is a drawing for describing a determining process carried out by a second determining section, and is a drawing illustrating a route along which an article is moved to a destination and a position of the destination, the route and the position having been determined by an adjusting section.
Figure 17:
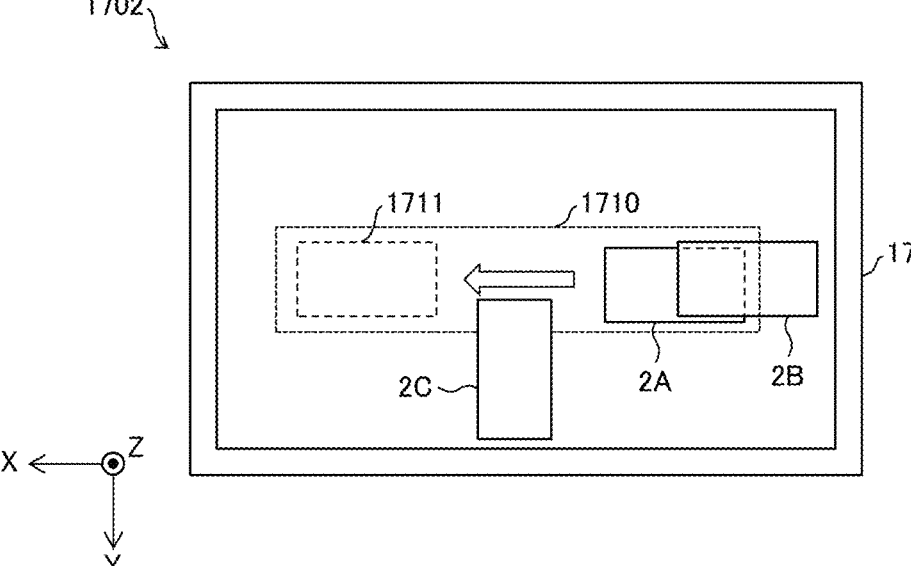

A determining process carried out by the second determining section 15f is described with reference to FIG. 17. FIG. 17 illustrates the movement destination position and the movement route of the article 2 which have been determined by the adjusting section 15d. It is assumed that, as illustrated in 1701 of FIG. 17, the adjusting section 15d has determined that an article 2A is to be moved along a movement route 1710 from a current position to a movement destination position 1711. The second determining section 15f determines that another article 2 that interferes movement of the article 2A is not present, unless another article 2 that interferes with the movement of the article 2A is present at the movement destination position 1711 and in the movement route 1710 as illustrated in 1701.

On the other hand, in a case where another article 2C is present, for example, in the movement route 1710 as illustrated in 1702 of FIG. 17, the second determining section 15f determines that another article 2 that interferes with the movement of the article 2A is present.

Software Implementation Example

The functions of the transfer system 1 (hereinafter, referred to as "device") can be realized by a program for causing a computer to function as the device, the program causing the computer to function as the control blocks (particularly, the sections included in the control section 15) of the device.

In this case, the device includes, as hardware for executing the program, a computer that includes at least one control device (e.g., a processor) and at least one storage device (e.g., a memory). By the control device executing the program with use of the storage device, the functions described in the foregoing embodiments are realized.

The program may be recorded in one or more non-transitory computer-readable recording media. The one or more recording media may or may not be included in the device. In the latter case, the program may be supplied to or made available to the device via any wired or wireless transmission medium.

Alternatively, a part or all of the functions of the control blocks can be realized by a logic circuit. For example, the present invention encompasses, in its scope, an integrated circuit in which a logic circuit that functions as each of the control blocks is formed. Alternatively, the functions of the control blocks can be realized, for example, by a quantum computer.

Each of the processes described in the foregoing embodiments may be carried out by artificial intelligence (AI). In this case, the AI may operate in the control device or may operate in another device (e.g., an edge computer or a cloud server).

Aspects of the present invention can also be expressed as follows:

A transfer system in accordance with a first aspect of the present invention is a transfer system including: a transferring section that transfers an article from a container to an outside of the container, the transferring section including a picking head that holds the article by adhering to the article by suction, a driving section that drives the picking head in a horizontal direction and a vertical direction, and a holding direction changing section that changes a direction in which the picking head is held; a camera section that captures an image of the article in the container; a first determining section that determines whether or not the transferring section can hold and transfer the article, on the basis of a posture of the article the image of which has been captured by the camera section; and an adjusting section that, in a case where the first determining section determines that the transferring section cannot transfer the article, controls the driving section and the holding direction changing section of the transferring section so that the posture and a position of the article are adjusted to a posture and a position that allow the transferring section to hold and transfer the article.

This makes it possible to reset an article, which is in a posture in which the transferring section cannot hold and transfer the article, so that the article is in a posture in which the transferring section can transfer the article. Furthermore, since a determination is made only with image capturing by the camera section, it is possible to make a determination as to resetting, with a simple configuration.

The transfer system in accordance with a second aspect of the present invention is arranged such that, in the first aspect, the first determining section determines whether or not the transferring section can hold and transfer the article, by comparing (i) an area of the article in the image that has been captured by the camera section and (ii) an area of one of surfaces of the article, the area being indicated by a shape of the article, the shape being stored in advance.

The transfer system in accordance with a third aspect of the present invention is arranged such that, in the first or second aspect, a holdable surface on which the picking head can hold the article is determined in advance; and the first determining section determines whether or not the transferring section can hold and transfer the article, on the basis of whether or not the holdable surface of the article is at an angle equal to or narrower than a given angle with respect to a horizontal surface.

The transfer system in accordance with a fourth aspect of the present invention is arranged such that, in any one of the first through third aspects, the first determining section determines whether or not the transferring section can hold and transfer the article, on the basis of whether or not another article overlaps at least a part of the article that is a determination target.

The transfer system in accordance with a fifth aspect of the present invention is arranged such that, in any one of the first through fourth aspects, in a case where the first determining section determines that the transferring section cannot transfer the article, because the holdable surface of the article that is a determination target is not at an angle equal to or narrower than the given angle with respect to the horizontal surface, the adjusting section controls the driving section and the holding direction changing section so that the direction in which the picking head is held is adjusted to a direction perpendicular to the holdable surface of the article and the posture and the position of the article are adjusted.

The transfer system in accordance with a sixth aspect of the present invention is arranged so as to, in any one of the first through fifth aspects, further include an estimating section that estimates a direction of the holdable surface of the article on the basis of the image of the article which image has been captured by the camera section, the adjusting section controlling the driving section and the holding direction changing section so that the posture and the position of the article are adjusted with use of the direction of the holdable surface which direction has been estimated by the estimating section.

The transfer system in accordance with a seventh aspect of the present invention is arranged such that, in any one of the first through sixth aspects, the picking head includes a plurality of suction members; and in a case where the holdable surface of the article is not at an angle equal to or narrower than the given angle with respect to the horizontal surface, the adjusting section controls the driving section and the holding direction changing section so that at least a part of the plurality of suction members is caused to adhere to the holdable surface by suction and the posture and the position of the article are adjusted.

The transfer system in accordance with an eighth aspect of the present invention is arranged such that, in any one of the first through seventh aspects, in a case where the first determining section determines that the transferring section cannot transfer the article, because another article overlaps a part of the article that is a determination target, the adjusting section controls the driving section and the holding direction changing section so that the picking head is caused to hold the holdable surface of the article, the picking head is raised in the vertical direction and moved to a direction opposite from the another article, and the posture and the position of the article are adjusted.

The transfer system in accordance with a ninth aspect of the present invention is arranged so as to, in any one of the first through eighth aspects, further include a second determining section that determines whether or not another article that interferes with adjustment of the posture and the position of the article is present at a holding position at which the picking head holds the article, in a route along which the article is moved to a destination, and at a position of the destination, the holding position, the route, and the position of the destination being for when the adjusting section controls the driving section and the holding direction changing section so that the posture and the position of the article are adjusted.

A method for controlling a transfer system in accordance with a tenth aspect of the present invention is a method for controlling a transfer system which includes: a transferring section that transfers an article from a container to an outside of the container and that includes a picking head that holds the article by adhering to the article by suction, a driving section that drives the picking head in a horizontal direction and a vertical direction, and a holding direction changing section that changes a direction in which the picking head is held; and a camera section that captures an image of the article in the container, the method including: a determining step of determining whether or not the transferring section can hold and transfer the article, on the basis of a posture of the article the image of which has been captured by the camera section; and an adjusting step of, in a case where it is determined in the determining step that the transferring section cannot transfer the article, controlling the driving section and the holding direction changing section of the transferring section so that the posture and a position of the article are adjusted to a posture and a position that allow the transferring section to hold and transfer the article.

The transfer system in accordance with each aspect of the present invention may be realized by a computer. In this case, the present invention also encompasses, in its scope, a control program for the transfer system and a computer-readable recording medium in which the control program is recorded, the control program causing the transfer system to be realized by the computer by causing the computer to operate as each section (software element) included in the transfer system.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Transfer system
2, 2A, 2B, 2C Article
11 Transporting section
12 Transferring section
12*a* Picking head
12*b* Driving section
12*g* Holding direction changing section
13 Camera section
15 Control section
15*a* Image obtaining section
15*b* Image processing section
15*c* First determining section
15*d* Adjusting section
15*e* Estimating section
15*f* Second determining section
15*x* Driving control section
17 First container
1710 Movement route
1711 Movement destination position

The invention claimed is:

1. A transfer system comprising:
a transferring section that transfers an article from a container to an outside of the container,
the transferring section including
    a picking head that holds the article by adhering to the article by suction,
    a driving section that drives the picking head in a horizontal direction and a vertical direction, and
    a holding direction changing section that changes a direction in which the picking head is held;
a camera section that captures an image of the article in the container;
a first determining section that determines whether or not the transferring section can hold and transfer the article, on the basis of a posture of the article the image of which has been captured by the camera section; and
an adjusting section that, in a case where the first determining section determines that the transferring section cannot transfer the article, controls the driving section and the holding direction changing section of the transferring section so that the posture and a position of the article are adjusted to a posture and a position that allow the transferring section to hold and transfer the article.

2. The transfer system as set forth in claim 1, wherein the first determining section determines whether or not the transferring section can hold and transfer the article, by comparing (i) an area of the article in the image that has been captured by the camera section and (ii) an area of one of surfaces of the article, the area being indicated by a shape of the article, the shape being stored in advance.

3. The transfer system as set forth in claim 1, wherein:
a holdable surface on which the picking head can hold the article is determined in advance; and the first determining section determines whether or not the transferring section can hold and transfer the article, on the basis of whether or not the holdable surface of the article is at an angle equal to or narrower than a given angle with respect to a horizontal surface.

4. The transfer system as set forth in claim 3, wherein the first determining section determines whether or not the transferring section can hold and transfer the article, on the basis of whether or not another article overlaps at least a part of the article that is a determination target.

5. The transfer system as set forth in claim 3, wherein,
in a case where the first determining section determines that the transferring section cannot transfer the article, because the holdable surface of the article that is a determination target is not at an angle equal to or narrower than the given angle with respect to the horizontal surface,
the adjusting section controls the driving section and the holding direction changing section so that the direction in which the picking head is held is adjusted to a direction perpendicular to the holdable surface of the article and the posture and the position of the article are adjusted.

6. The transfer system as set forth in claim 5, further comprising
an estimating section that estimates a direction of the holdable surface of the article on the basis of the image of the article which image has been captured by the camera section,
the adjusting section controlling the driving section and the holding direction changing section so that the posture and the position of the article are adjusted with use of the direction of the holdable surface which direction has been estimated by the estimating section.

7. The transfer system as set forth in claim 5, wherein:
the picking head includes a plurality of suction members; and
in a case where the holdable surface of the article is not at an angle equal to or narrower than the given angle with respect to the horizontal surface, the adjusting section controls the driving section and the holding direction changing section so that at least a part of the plurality of suction members is caused to adhere to the holdable surface by suction and the posture and the position of the article are adjusted.

8. The transfer system as set forth in claim 3, wherein,
in a case where the first determining section determines that the transferring section cannot transfer the article, because another article overlaps a part of the article that is a determination target, the adjusting section controls the driving section and the holding direction changing section so that the picking head is caused to hold the holdable surface of the article, the picking head is raised in the vertical direction and moved to a direction opposite from the another article, and the posture and the position of the article are adjusted.

9. The transfer system as set forth in claim 1, further comprising
a second determining section that determines whether or not another article that interferes with adjustment of the posture and the position of the article is present in a route along which the article is moved to a destination and at a position of the destination, the route and the position of the destination being for when the adjusting section controls the driving section and the holding direction changing section so that the posture and the position of the article are adjusted.

10. A method for controlling a transfer system which includes: a transferring section that transfers an article from a container to an outside of the container and that includes a picking head that holds the article by adhering to the article by suction, a driving section that drives the picking head in a horizontal direction and a vertical direction, and a holding direction changing section that changes a direction in which the picking head is held; and a camera section that captures an image of the article in the container, the method comprising:
a determining step of determining whether or not the transferring section can hold and transfer the article, on the basis of a posture of the article the image of which has been captured by the camera section; and
an adjusting step of, in a case where it is determined in the determining step that the transferring section cannot transfer the article, controlling the driving section and the holding direction changing section of the transferring section so that the posture and a position of the article are adjusted to a posture and a position that allow the transferring section to hold and transfer the article.

11. A non-transitory computer-readable recording medium in which a control program is recorded, the control program being for causing a computer to carry out the determining step and the adjusting step in the method recited in claim 10.

* * * * *